(12) United States Patent
Villalobos et al.

(10) Patent No.: US 11,432,531 B2
(45) Date of Patent: Sep. 6, 2022

(54) SYSTEMS, METHODS, AND APPARATUSES FOR IMPLEMENTING REAL TIME BEEF CATTLE MONITORING UTILIZING RADIO-FREQUENCY IDENTIFICATION (RFID) BASED TECHNOLOGIES

(71) Applicant: Arizona Board of Regents on Behalf of Arizona State University, Scottsdale, AZ (US)

(72) Inventors: Jesus Rene Villalobos, Mesa, AZ (US); Octavio Sanchez, Hermosillo (MX); Cesar Meneses, Hermosillo (MX)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 341 days.

(21) Appl. No.: 16/826,709

(22) Filed: Mar. 23, 2020

(65) Prior Publication Data

US 2021/0289746 A1 Sep. 23, 2021
US 2022/0183255 A9 Jun. 16, 2022

Related U.S. Application Data

(60) Provisional application No. 62/822,399, filed on Mar. 22, 2019.

(51) Int. Cl.
*A01K 29/00* (2006.01)
*A01K 11/00* (2006.01)
(Continued)

(52) U.S. Cl.
CPC ............. *A01K 11/004* (2013.01); *A01K 5/01* (2013.01); *A01K 5/02* (2013.01); *A01K 29/005* (2013.01);
(Continued)

(58) Field of Classification Search
CPC .. A01K 11/004; A01K 29/005; A01K 1/0023; A01K 11/006; A01K 11/008;
(Continued)

(56) References Cited

U.S. PATENT DOCUMENTS 6,375,612 B1 * 4/2002 Guichon ................ G16H 40/67
119/51.02
8,282,557 B2 * 10/2012 Haynes .................. G01G 13/24
600/443

(Continued)

OTHER PUBLICATIONS

Bishop-Hurley, G., et al. "An investigation of cow feeding behavior using motion sensors," Instrumentation and Measurement Technology Conference (I2MTC) Proceedings, 2014 IEEE International, pp. 1285-1290.

(Continued)

*Primary Examiner* — Yvonne R Abbott-Lewis
(74) *Attorney, Agent, or Firm* — Elliott, Ostrander & Preston, P.C.

(57) ABSTRACT

In accordance with embodiments disclosed herein, there are provided methods and systems for real-time beef cattle monitoring utilizing Radio-Frequency Identification (RFID) based technologies. For example, there is disclosed a system having at least a memory to store instructions; a processor to execute the instructions; a database to store data for heads of livestock, wherein each head of livestock is individually identified via a Radio-Frequency Identification (RFID) tag, the RFID tag uniquely identifying each of the heads of livestock to the system; a plurality of antennas to read information transmitted from the RFID tags; a transactional and analytical server to receive the information transmitted from the RFID tags and to store the information in the database; wherein the transactional and analytical server to further analyze the information stored in the database to identify when each head of livestock is present within a (Continued)

defined feeding zone; and monitoring the heads of livestock for anomalous feeding behavior based on the analysis. Other related embodiments are disclosed.

20 Claims, 15 Drawing Sheets

(51) Int. Cl.
    *G06K 19/077*     (2006.01)
    *A01K 5/01*     (2006.01)
    *A01K 5/02*     (2006.01)
    *G06K 7/10*     (2006.01)

(52) U.S. Cl.
    CPC ... *G06K 7/10356* (2013.01); *G06K 19/07758* (2013.01)

(58) Field of Classification Search
    CPC .......... A01K 29/00; A01K 5/02; A01K 5/001; A01K 5/002; G06K 7/10356; G06K 19/07758
    USPC .............. 119/51.02, 174, 511, 712, 840, 515
    See application file for complete search history.

(56) References Cited

U.S. PATENT DOCUMENTS

| | | | | |
|---|---|---|---|---|
| 8,642,262 | B2* | 2/2014 | Stroman | G06Q 30/0203 435/7.1 |
| 8,930,148 | B2* | 1/2015 | Huisma | A01K 5/02 119/51.02 |
| 2007/0288249 | A1* | 12/2007 | Rowe | A01K 11/008 705/7.11 |
| 2008/0314325 | A1* | 12/2008 | Hempstead | A01K 1/0023 119/51.02 |
| 2010/0107985 | A1* | 5/2010 | O'Hare | A01K 11/006 119/174 |

OTHER PUBLICATIONS

Lu, C., et al., "EWMA control charts for monitoring the mean of autocorrelated processes," Quality Control and Applied Statistics 44(6), 1999, pp. 601-602.

De Vries, A., et al., "Application of statistical process control charts to monitor changes in animal production systems," Journal of Animal Science, 88(13 electronic suppl), 2010, pp. E11-E24.

Duncan, A., Quality control and industrial statistics, 5th Edition, 1986.

Dutta, R., et al., "Dynamic cattle behavioural classification using supervised ensemble classifiers," Computers and Electronics in Agriculture, 111 (2015), pp. 18-28.

González, L. A., et al., "Behavioral classification of data from collars containing motion sensors in grazing cattle," (2015) Computers and Electronics in Agriculture, 110, pp. 91-102.

IndexMundi, "Beef Historical Price," Accessed Feb. 23, 2013, http://www.indexmundi.com/commodities/?commodity=beef&months=180.

Juran, J., et al., Quality planning and analysis (1980).

Langley, G., et al., The Improvement Guide (1996), p. 10.

Madsen, T., et al., "A model for monitoring the condition of young pigs by their drinking behaviour," (2005) Computers and electronics in agriculture, 48(2), pp. 138-154.

Quimby, W. F., et al., "Application of feeding behaviour to predict morbidity of newly received calves in a commercial feedlot" (2001), Canadian Journal of Animal Science, 81(3), pp. 315-320.

Ruiz-Garcia, L., et al., "The role of RFID in agriculture: Applications, limitations and challenges" (2011), Computers and Electronics in Agriculture, 79(1), pp. 42-50.

Schroeder, T., et al., "International cattle ID and traceability: Competitive implications for the US." (2012), Food Policy, 37(1), pp. 31-40.

Sowell, B.F., et al., "Radio frequency technology to measure feeding behavior and health of feedlot steers," (1998) Applied Animal Behaviour Science, 59(4), pp. 277-284.

Trevarthen, A., et al., "The RFID-enabled dairy farm: towards total farm management," In Mobile Business (Jul. 2008) ICMB'08, 7th International Conference on IEEE, pp. 241-250.

Voulodimos, A., et al., "A complete farm management system based on animal identification using RFID technology," (2010) Computers and Electronics in Agriculture, 70(2), pp. 380-388.

Wisner, J., et al., "A Study of Quality Improvement Practices in the Transportation Industry," (1997), Journal of Business Logistics.

\* cited by examiner

Start

↓

Operating a database system storing data for heads of livestock, wherein each head of livestock is individually identifiable via a Radio-Frequency Identification (RFID) tag affixed to each of the heads of livestock, the RFID tag uniquely identifying each of the heads of livestock to the system.
750

↓

Reading information transmitted from the RFID tags via an antenna array formed from a plurality of antennas configurable to read the information upon any one or more of the heads of livestock entering a defined feeding zone.
755

↓

Receiving the information transmitted from the RFID tags and storing the information in the database system defining at least (i) a time of entry into the defined feeding zone and (ii) a time of exit from the defined feeding zone.
760

↓

Analyzing the information stored in the database system to determine when each head of livestock is present within the defined feeding zone.
765

↓

Monitoring the heads of livestock for anomalous feeding behavior based on the analysis.
770

↓

Triggering an automatic alert notification when the anomalous feeding behavior is identified for any one of the heads of livestock.
775

↓

End

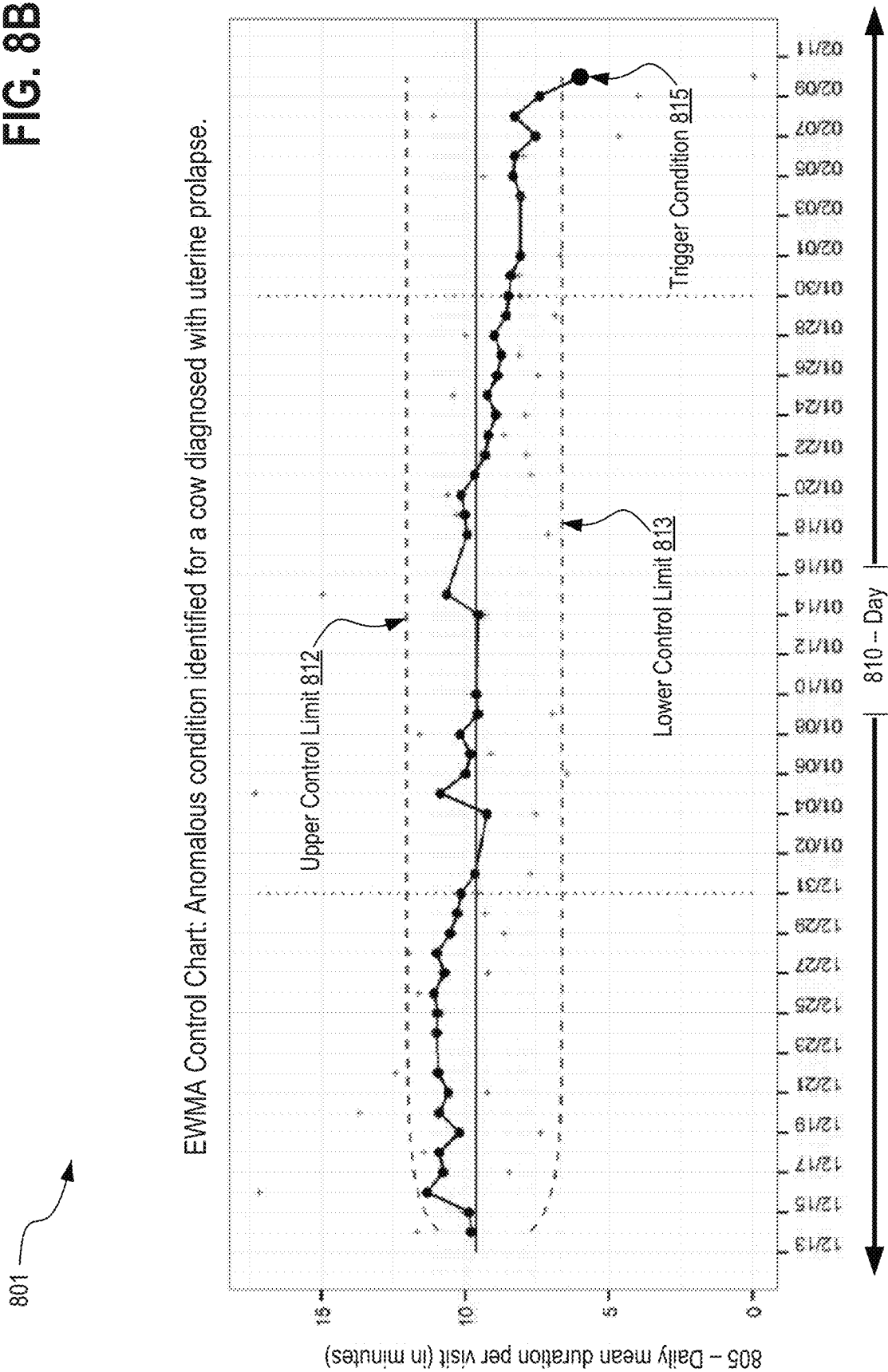

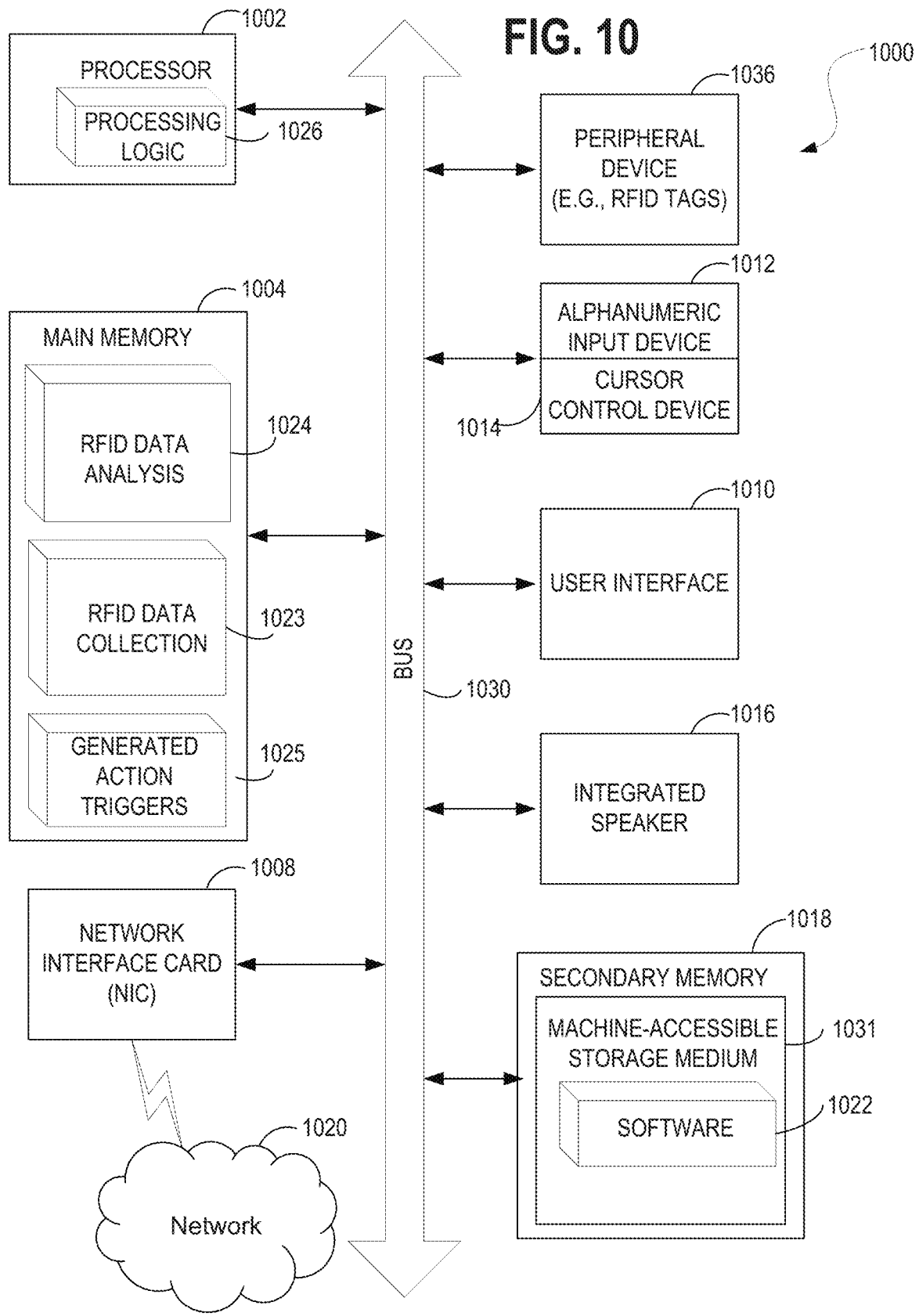

SYSTEMS, METHODS, AND APPARATUSES FOR IMPLEMENTING REAL TIME BEEF CATTLE MONITORING UTILIZING RADIO-FREQUENCY IDENTIFICATION (RFID) BASED TECHNOLOGIES

CLAIM OF PRIORITY

This application is related to, and claims priority to, the provisional utility application entitled "SYSTEMS, METHODS, AND APPARATUSES FOR IMPLEMENTING REAL TIME BEEF CATTLE MONITORING UTILIZING RADIO-FREQUENCY IDENTIFICATION (RFID) BASED TECHNOLOGIES," filed on Mar. 22, 2019, having an application number of 62/822,399, the entire contents of which are incorporated herein by reference.

GOVERNMENT RIGHTS AND GOVERNMENT AGENCY SUPPORT NOTICE

This invention was funded by a government agency. This invention was made with government support pursuant to a proposal submitted to Conacyt (the Mexican Council for Science and Technology) and a resulting grant provided by Conacyt, which is the Mexico Government's National Science Foundation (NSF) counterpart. Certain government agencies may possess certain rights in the invention pursuant to the obligation of such a grant.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of livestock monitoring systems, and more particularly, to systems, methods, and apparatuses for implementing real-time beef cattle monitoring utilizing Radio-Frequency Identification (RFID) based technologies.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

In 2013, the United States Department of Agriculture (USDA) reported that globally, there was a population of beef cattle of more than 452 million. The population of beef cattle population represents approximately 45% of the world's cattle population.

Traditionally, research and technology development activities have favored dairy cattle. Consider for instance that a search in Google Scholar (scholar.google.com) on the topic "dairy cow" resulted in a total of 679,000 records, while a search using the words "beef cow" yielded a total of 291,000 results.

Nevertheless, technology needs for the rearing of beef cattle have been attracting attention lately due to the increase in selling prices trends in recent years. Over a 15 year period, the price of beef in the United States increased from a minimum of us $0.7426/pound to US $1.9539/pound in January 2013 (IndexMundi 2013), representing an increase of 2.6 times over that period of time. While the increase in the size of the beef cattle industry has been impressive, particularly when compared to the dairy cattle industry, is paradoxical that most of the developments in terms of technological advances in the cattle industry have centered on the dairy cattle industry specifically, rather than on the quickly growing beef cattle industry.

Separately, Radio Frequency Identification (RFID) technology is a well matured technology, having been utilized in the cattle industry at large since approximately 1979. For instance, RFID technologies have been used for, among other things, tracking production trends and medical supplies applied to each individual cow. Use of such technology has allowed the dairy industry to enjoy continuous improvement and through the use of various analytics related activities. Currently, most of the mid and large size dairy operations use some type of ID technology, mostly radio frequency based, for monitoring productivity and health at the level of the individual cattle head.

Conversely, the beef cattle industry monitoring and tracking efforts at the cow level is less pervasive and less frequent due to a unique set of challenges facing the beef cattle industry when compared with the dairy cow industry. Such an unmet economic need in the marketplace is somewhat surprising since the value add of the feedlots occur over a limited time period (usually less than 6 months) which thus necessitates close monitoring of the growth development of each cow to take corrective actions if needed.

A feedlot or feed yard for beef cattle is a type of Animal Feeding Operation (AFO) which is used in high volume and high intensity animal farming for finishing livestock, notably beef cattle, but also applies to the farming of swine, horses, sheep, turkeys, chickens, ducks, etc., prior to slaughter.

An estimated 80% of total farm-to-table cost of beef occurs within the feedlot, and of that total, an estimated 95% is directly related to the cost of cattle, feed and veterinary services. The value add attributable to the feedlot is derived from weight gained and beef quality. Thus, one of the main profit drivers for the beef cattle industry is the efficient transformation of inputs (mostly forage, grain, other nutrient sources and medicines) to output (beef cattle weight and quality).

Therefore, metrics which enable close monitoring of the beef cattle farming operation at the individual cow level, such as weight gained per period for each head of beef cattle, feed intake per head of beef cattle, and other proxies for health, are key to the efficient management of feed operations, particularly feedlots.

Unfortunately, real-time monitoring of key performance metrics for individual heads of beef cattle in the US feedlot industry is not commercially available at this time, and thus, beef cattle farms have no viable platform to select and implement.

In certain cases where limited monitoring has been implemented, such monitoring has been deployed utilizing passive sensors which provide event-based information for bookkeeping type of operations and do not provide telemetry data at the individual cow level nor do such solutions provide any means of real-time monitoring, thus resulting in a clear disadvantage in terms of competitiveness in the global marketplace due to resulting inefficiencies.

Embodiments of the invention therefore improve the ability to collect, monitor, analyze, and trigger specific actions (some automated and others manual) based on the systematic collection of accurate inputs in real-time which are generated and captured at the individual cow level. Stated differently, the methodologies described herein provide pragmatic solutions to managing and controlling of critical systems utilized in at least the feedlot phase of farming and finishing beef cattle so as to realize and yield greater efficiencies throughout production, resulting in a greater output of marketable beef for a same or lower cost of input (e.g., grain, nutrients, medicine, etc.) and at an expected higher quality grade level on average for marketable beef produced utilizing such processes.

The present state of the art may therefore benefit from the systems, methods, and apparatuses for implementing real-time beef cattle monitoring utilizing Radio-Frequency Identification (RFID) based technologies, as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 7B depicts a flow diagram illustrating a method for real-time beef cattle monitoring utilizing Radio-Frequency Identification (RFID) based technologies via a beef cattle monitoring platform, in accordance with described embodiments;

FIGS. 8A and 8B depict EWMA control charts showing the individual observations of an individual animal as well as the metrics being used by each chart respectively, in accordance with described embodiments;

FIG. 10 illustrates a diagrammatic representation of a system for implementing real-time beef cattle monitoring utilizing Radio-Frequency Identification (RFID) based technologies, depicted in the exemplary form of a computer system, in accordance with one embodiment.

DETAILED DESCRIPTION

Figure 1A:
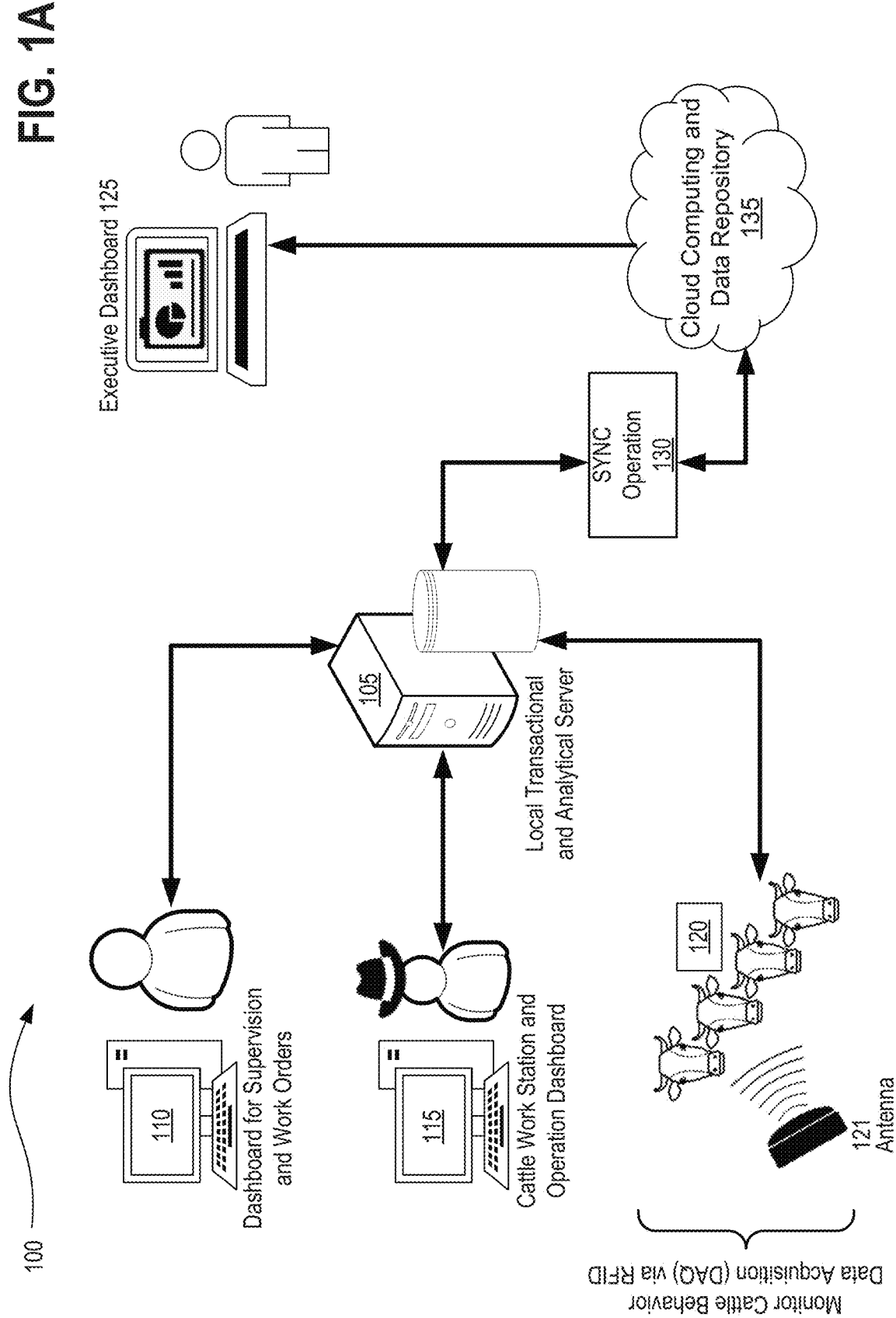
FIG. 1A depicts an exemplary system for implementing real-time beef cattle monitoring utilizing Radio-Frequency Identification (RFID) based technologies, in accordance with described embodiments.

Described herein are systems, methods, and apparatuses for implementing real-time beef cattle monitoring utilizing Radio-Frequency Identification (RFID) based technologies. For example, there are described in accordance with certain embodiments: a system having at least a memory to store instructions; a processor to execute the instructions; a database to store data for heads of livestock, in which each head of livestock is individually identified via a Radio-Frequency Identification (RFID) tag, the RFID tag uniquely identifying each of the heads of livestock to the system; a plurality of antennas to read information transmitted from the RFID tags; a transactional and analytical server to receive the information transmitted from the RFID tags and to store the information in the database; in which the transactional and analytical server to further analyze the information stored in the database to identify when each head of livestock is present within a defined feeding zone; and monitoring the heads of livestock for anomalous feeding behavior based on the analysis. According to certain embodiments, the systems, methods, and apparatuses described below specifically utilize one or more new generation sensors, each of which provide relatively large amounts of real-time data when compared with prior models. When combined with advanced analytics, the methodologies set forth herein vastly improve the current state of the art of the feedlot industry.

According to a particular embodiment, sensors attached to each head of beef cattle within a feed pen operate in conjunction with system architecture to facilitate, for example: determination of the presence of each and every individual head of beef cattle (e.g., such as each individual cow) within a designated feeding zone of the feed pen. Collected metrics may specifically determine, by way of example, which uniquely identifiable individual cow has entered the feeding zone, how long that specific cow remains within the feeding zone, the frequency of that cow entering and exiting the feeding zone, and various other calculable and determinable metrics. Such information is consumed by the system architecture to determine the dynamic behavior of cattle within the feedlot both as a group and also for each specific cow, providing both aggregated group data and per-head of cattle data for every individual and cow, each of whom are uniquely identifiable based on the RFID tag uniquely identifying each and every one of the heads of livestock present at any given time within the feedlot system.

The data provided by the system therefore permits farm operators to draw inferences about the dynamic behavior of the cattle such as feeding time (via direct metrics), and social behavior (via indirect metrics).

According to at least one embodiment, such a dynamic data acquisition system utilizes RFID tags worn by every cow in the feedlot which are then detected by antennas designed to identify the RFID tags when the cows approach the designated feeding zone (e.g., such as a trough or a designated and identifiable trough zone) of the feeding pen. For example, geo-fencing, antenna grids, antenna detection zones, or other relevant techniques may be utilized to identify when a particular RFID tag, and the associated individual head of beef cattle to which the RFID tag is attached, actually enters and exits a given detection zone. The antennas are each configurable to transmit RFID tag detection, ID recognition, and presence information to a server through various means, such as wirelessly through a private communications network, over a wired LAN, via a hybrid wireless and wired system, as well as utilizing public Internet backhaul connections (with or without a VPN) to a cloud based service which collects, aggregates, and processes the metrics, data, and information described herein.

Practice of the described embodiments and use of the real-time data collection and processing for detecting and addressing individual behavior anomalies of the cattle under observations is thus expected to present significant cost savings and unique advantages to beef cattle farm operators.

Described embodiments utilize both a data collection and a monitoring or surveillance component that together enable the described system to promptly detect abnormal individual cattle behavior, allowing feedlot operators to take appropriate action to address the underlying problem, resulting in further cost savings.

As noted above, an approximate 80% of the total farm-to-table cost of beef happens within the feedlot with an estimated 95% being related to the cost of cattle, feed and veterinary services. Therefore, it is a significant advantage to such feedlot operators to have available to them through the practice of the disclosed embodiments, unique functionality implementing the described monitoring and management systems to keep production costs down so as to yield a competitive advantage, permitting such operators to stay ahead of the competition in an industry with low profit margins. With respect to market size, the National Cattlemen's Beef Association reported in January 2016 that of the 13.1 million head of beef cattle presently on feed, 81% reside at feedlots with greater than 1,000 head capacity, thus presenting a significant opportunity for efficiency gains, even if only implemented by larger 1000 plus head operators.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various customizable and special purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), Radio-frequency identification (RFID) chips or tags, etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIG. 1A depicts an exemplary system 100 for implementing real-time beef cattle monitoring utilizing Radio-Frequency Identification (RFID) based technologies, in accordance with described embodiments.

As depicted here, there is a dashboard for supervision and work orders at element 110, a cattle work station and operation dashboard at element 115, and a cattle behavior and data acquisition operation via RFID at element 120 via which to monitor and supervise the heads of beef cattle as they enter and exit a designated zone or area, such as the feeding pens. Each of elements 110, 115, and the antennas 121 at element 120 communicate with the local transactional and analytical server at element 105.

Further depicted are the executive dashboard at element 125 which is communicatively interfaced with, and syncs (via synchronization operation at element 130) to the local transaction and analytical server 105 through the cloud computing and data repository as shown at element 135.

Table 1 depicts the change of volumes and values over time for US exports of beef. Specifically, it is shown below that volume in metric tons has increased from approximately 321,000 to nearly 1.2 million in just 10 years, thus representing a massive opportunity for introducing operational efficiencies, such as those described herein.

TABLE 1

| Year | Volume (Metric Tons) | Value ($Billions) | Value ($/kg) |
| --- | --- | --- | --- |
| 2004 | 321,967.00 | 0.809 | 2.51 |
| 2005 | 472,668.00 | 1.365 | 2.89 |
| 2006 | 655,920.00 | 2.041 | 3.11 |
| 2007 | 771,196.00 | 2.617 | 3.39 |
| 2008 | 984,712.00 | 3.619 | 3.68 |
| 2009 | 897,376.00 | 3.082 | 3.43 |
| 2010 | 1,067,279.00 | 4.078 | 3.82 |
| 2011 | 1,287,259.00 | 5.42 | 4.21 |
| 2012 | 1,133,940.00 | 5.511 | 4.86 |
| 2013 | 1,172,792.00 | 6.157 | 5.25 |

The RFID based tracking system described in greater detail below may be utilized to identify when each head of beef cattle approaches the feed zone to determine not only the time of day but additionally the length of time that each particular cow feeding. This information is useful not only to make a direct connection between the feeding behavior of each cow and the various key performance metrics, but also, by aggregating information, the system operates to systematically identify social and individual behaviors that impact the fattening activities for the beef cattle monitored.

An instance of social behavior that may impact the fattening operations is given by naturally aggressive cows that charge other cows approaching the feeding zone to prevent them from eating from the trough. An instance of individual behavior that may impact the performance of the feeding operation is determinable when a "shy" cow waits until the rest of the heard has finished eating before approaching the trough. Both cases of aggressive cows and shy cows result in the group of cows not progressing optimally in their feeding progression which thus in turn results in a consequent loss of revenue (e.g., due to less weight) and increased costs (e.g., due to feed rations not being consumed optimally).

According to the described embodiments, Radio Frequency Identification (RFID) technology in particular may be utilized to collect data to monitor feeding behavior of each of the individual cows as well as the heard via aggregated data. In particular, the Livestock Analytics implemented by the local transaction and analytical server at element 105 may utilize antennas 121 in conjunction with RFID tags to detect when the cows in a pen of a feedlot approach the trough of the pen.

Such a system therefore provides a direct association between feeding behavior (e.g. based on collected metrics including frequency, time, etc.) with weight gain and thus permits the health of the cows to be tracked. Research has identified a relevant correlation between presence of cows in the feeding zone of the pen and weight gain. Thus, the system 100 utilizing the RFID technology ties the detected feeding behavior of the cows to the financial performance for feedlot operations by way of improved weight gain for a group of cattle, thus providing a positive affect on feedlot revenue.

Correlating feeding behavior with Key Performance Indicators (KPIs) through the collected metrics thus improves the cost-benefit of feedlot operation and presents an effective alternative when compared to processes for calculating actual weight conversion per cow, which requires significantly higher investments in infrastructure and equipment and lacks the ability to monitor feed and cattle weight individually in real time as is possible with the system 100 described herein.

Additional uses of RFID technologies permits the identification of cows and livestock to determine, among other things, the location and trajectories of individual cows. Based on real-time information generated by motion sensors operating in conjunction with the antennas 121, the system 100 is capable of discriminating among different activities of grazing cows. Some of the activities identified by the disclosed system 100 include eating, rumination (e.g., cud-chewing), and walking.

Other sensing means may include, for instance, GPS and accelerometer and magnetometer sensors for tracking movement. Where such implementations prove too bulky, expensive, and or exhibit limited transmission capabilities, the technologies may alternatively be embodied into a wearable collar for the cows being monitored, with such a collar having the sensors, wireless transmitters, and processors embedded therein. In such embodiments, the RFID tags may be kept separate or may be integrated with such a collar.

Certain implementations will give preference to RFID chips and tags due to their light weight, small footprint, and relatively low cost. Moreover, with use of such RFID chips and tags, it is further possible to offload much of the technological components away from the cow and away from the RFID tag, through the use of the antennas capable of reading the RFID tags on the individual cows, as depicted at elements 120 and 121. Notably, the RFID tags do not require high energy transmitters as would GPS based solutions.

Figure 1B:
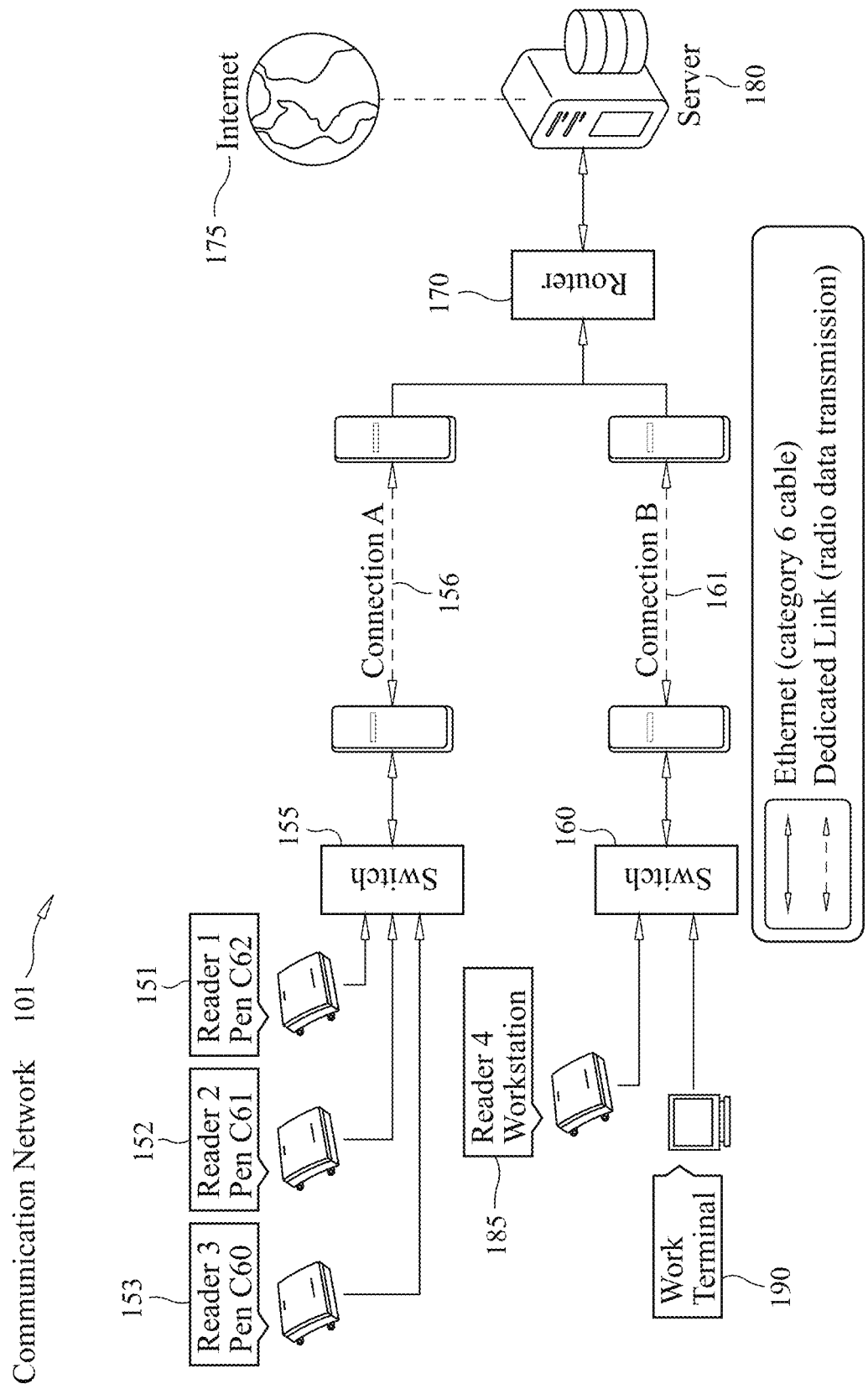
FIG. 1B depicts an exemplary communications network for use with a real-time beef cattle monitoring solution, in accordance with described embodiments.

FIG. 1B depicts an exemplary communications network 101 for use with a real-time beef cattle monitoring solution, in accordance with described embodiments.

Depicted here is a communication network 101 which includes readers 151, 152, and 153 at the respective pens C62, C61, and C60, each being communicatively interfaced with the router 170 and then to the server 180 and internet 175 via connection A 156 provided by switching hardware 155. The readers 151, 152, and 153 implement antennas via which to read the RFID tags.

Similarly, reader 4 workstation at element 185 and work terminal 190 are connected with the server 180 via router 170 and connection B which is implemented via switching hardware 160. Work terminal 190, reader 4 work station, and the various readers 151, 152, and 153 each are indirectly interfaced into the public Internet 175 as needed (or linked via a VPN) through the switching hardware 155 and 160 and router 170, according to such an embodiment. For instance, those implementations which utilize a cloud based service provider to collect, store, aggregate, and analyze data may communicate with such cloud based service provider via the public Internet.

According to certain embodiments, the system 100 of FIG. 1A and the communications network 101 of FIG. 1B implement a dynamic data acquisition system which includes RFID tags worn by each cow, which such tags being detected by antennas (as shown at element 120 of FIG. 1A) designed to identify the RFID tags when the cows approach a trough 265 or designated feeding zone of the feeding pen. For instance, the antennas and readers having detected the presence of an RFID tag and retrieved the unique ID from the RFID tag will then transmit uniquely identifying per-cow presence information to a server 180 through a private communications network or other communication means.

Figure 2:
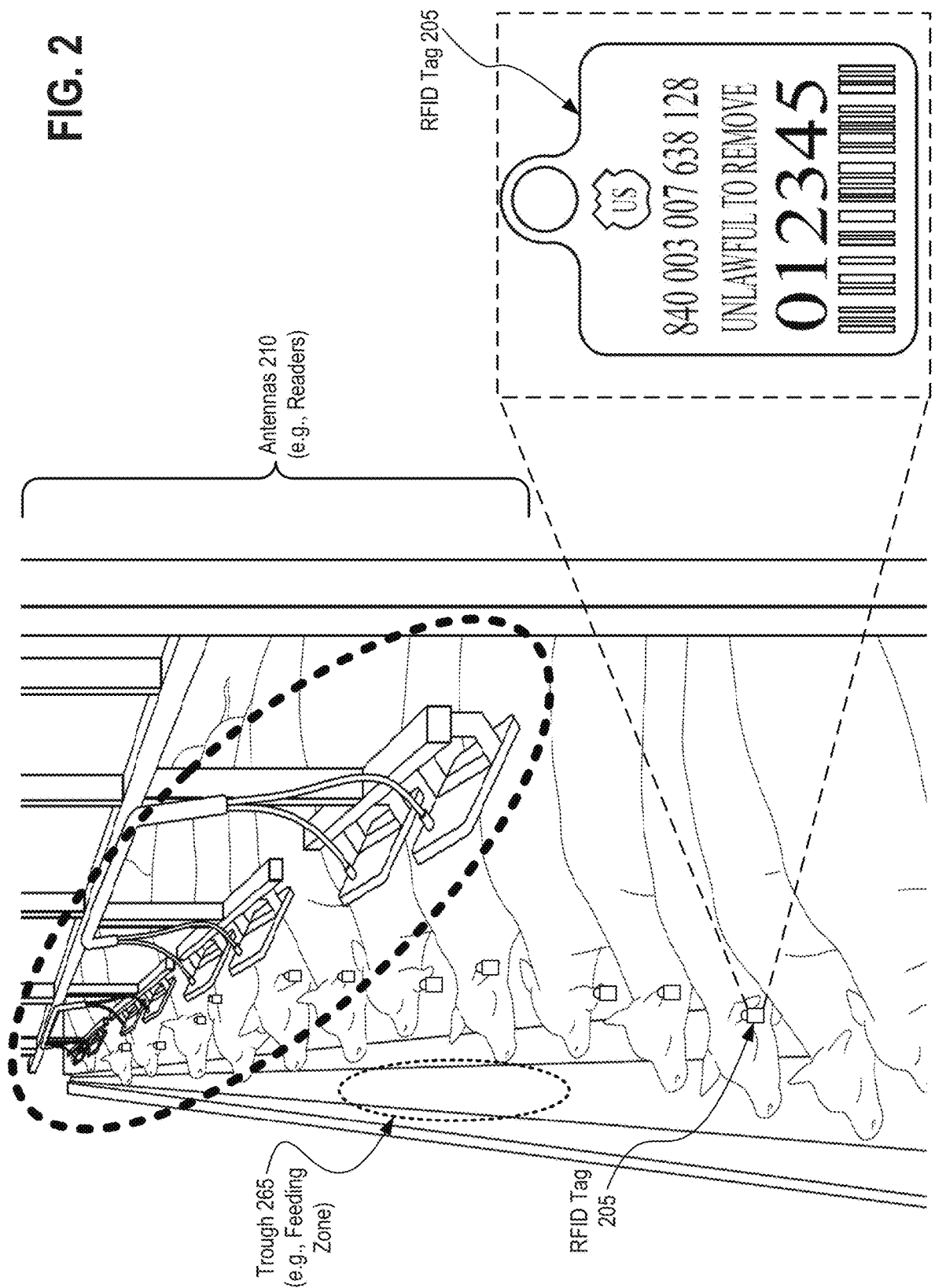
FIG. 2 depicts an exemplary RFID tag via which antennas or "readers" configured on the communications network 101 depicted at FIG. 1A may interface with and read information from the RFID tag, in accordance with described embodiments.

FIG. 2 depicts an exemplary RFID tag 205 via which antennas 230 or "readers" configured on the communications network 101 depicted at FIG. 1A may interface with and read information from the RFID tag 205, in accordance with described embodiments.

The RFID depicted here is representative of the type RaFid UHF TAG, made by Hanna Micron, however, other tags may be utilized. This particular RFID tag is to be worn as an earring by each of the individual heads of cattle which thus functions as a passive identifier that works between frequencies of 860-960 GHz. This exemplary tag gives a reading distance of up to 8 meters. The antennas 210 are strategically located above the feeding zone (e.g., above the feeding trough) and fastened to metal structures specifically designed for this application. FIG. 2 thus depicts an exemplary deployment of the antennas 210 and a picture of the RFID tag 205 as used within an exemplary system.

Results described herein represent the conclusion of a test implementation of the system for use by a beef feedlot commercial operation with an average headcount of 10,000 cows. In particular, the test implementation included sensors fitted to 189 cows held in three different feeding pens. The feeding cycle corresponded to an average of 130 days in the feeding pen.

A basic row data set produced by the current system results in a binary stream of data for each cow showing whether it is present in the feeding zone or not. The sampling frequency is one observation per second. The information is sent in almost real time to a server located remotely. This server receives and filters the data to obtain different individualized performance indicators. Some of these performance metrics include timing of the feeding, total number of visits to the trough zone, average time per day spent in the feeder and the average time per visit to the trough zone.

Figure 3:
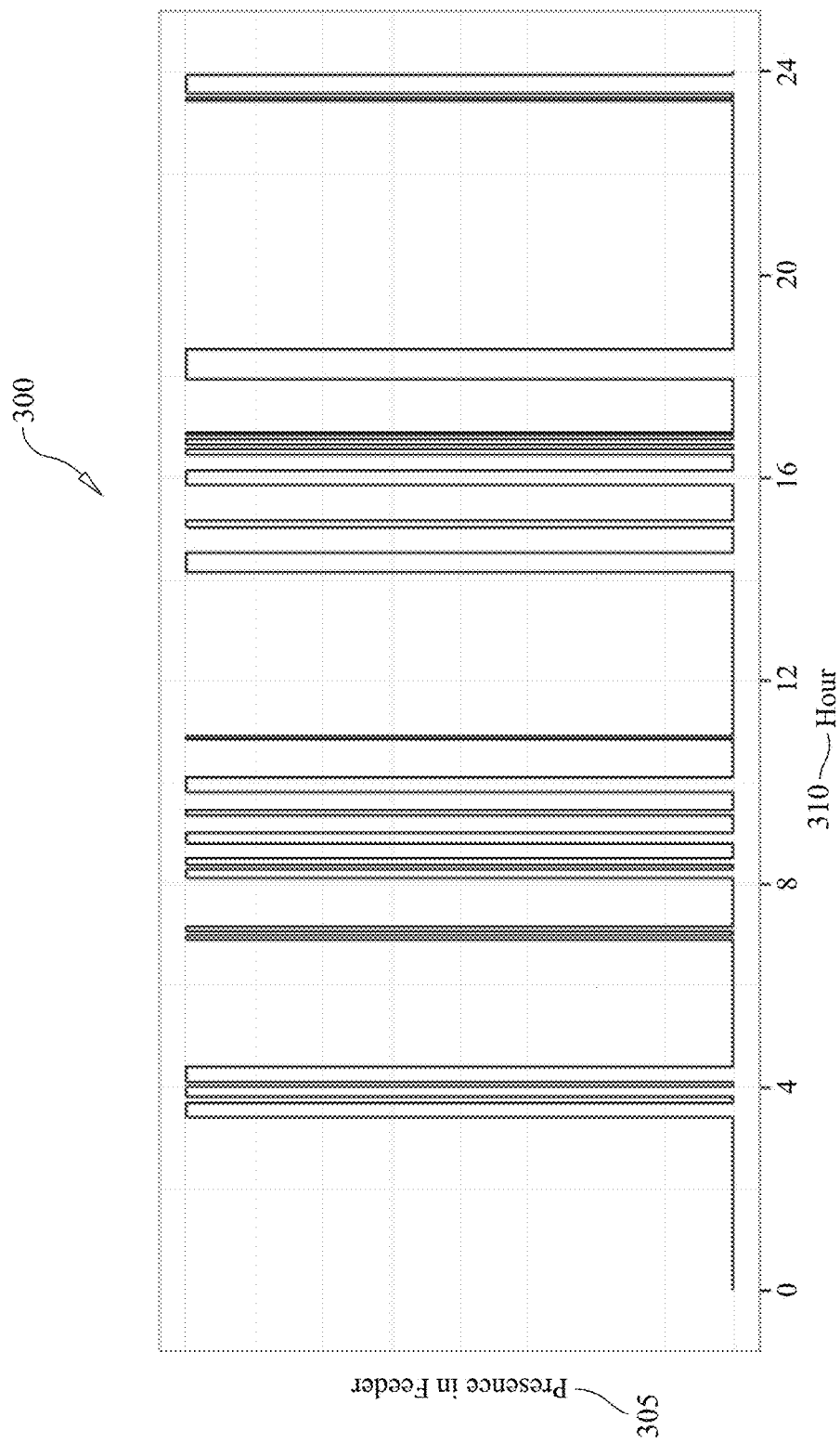
FIG. 3 depicts an exemplary graph of an individual and uniquely identifiable cow in the feeding zone, in accordance with described embodiments.

FIG. 3 depicts an exemplary graph 300 of an individual and uniquely identifiable cow in the feeding zone.

As shown here, the vertical axis depicts the presence of a cow in the feeder (element 305) in binary format with the peaks or high portions indicating presence detection and the low points indicating a lack of presence detection for that particular cow. More generally, the binary information depicts a signal indicating presence of an RFID tag (presumably tagged to cow) in the feeder pen. This particular signal indicates the presence of one signal or individual animal in the feeding zone of the holding pen over the course of a 24 hour period, represented via the horizontal axis depicting the hour at element 310.

Stated differently, the signal information detects either that a cow associated with the particular RFID tag is affirmatively detected in the feeding zone or is simply not detected in the feeding zone.

Figure 4:
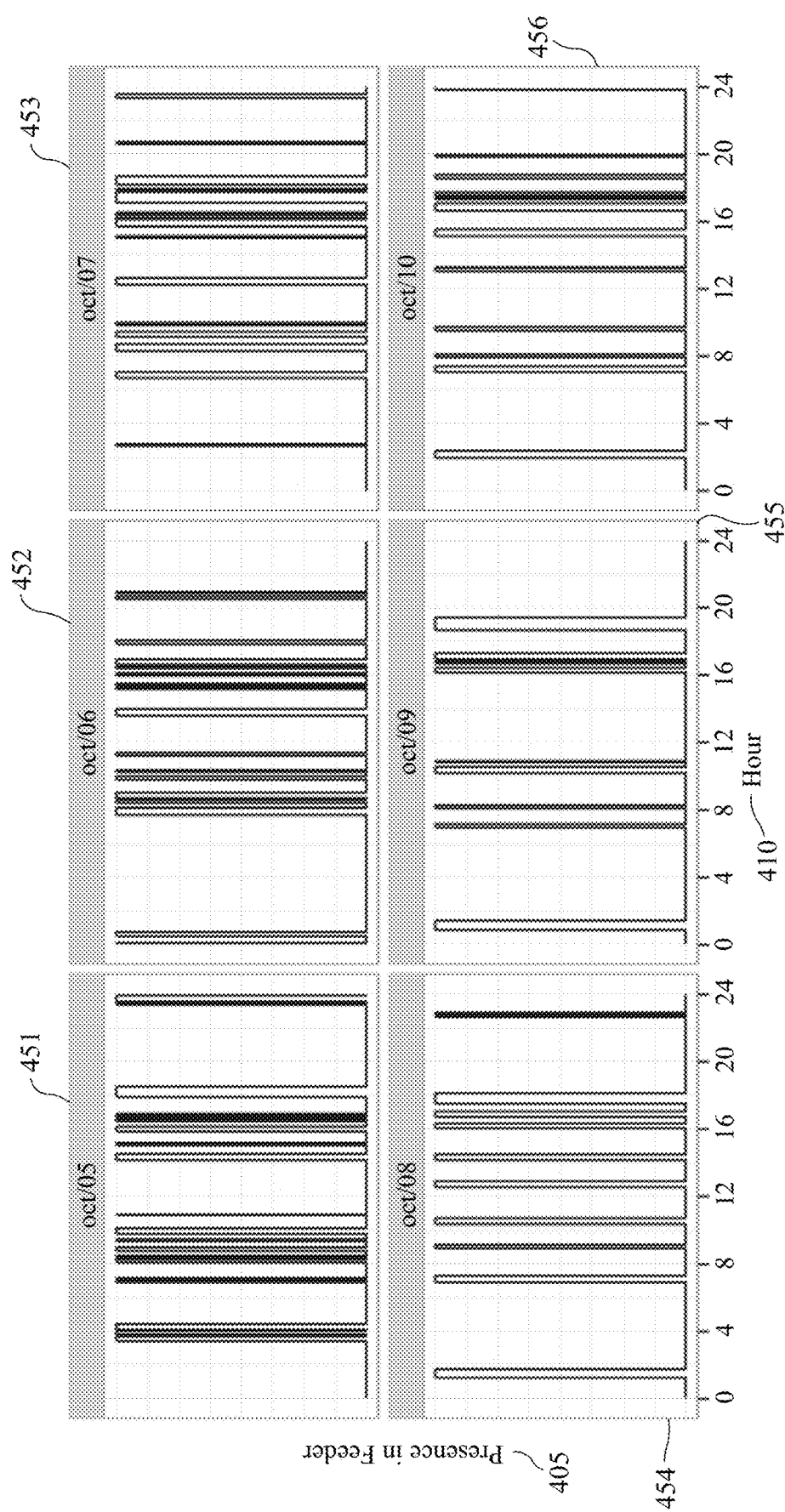
FIG. 4 shows the data generated by the same animal over broken out by hour on the horizontal axis for each of several days of the feeding cycle, in accordance with described embodiments.

FIG. 4 shows the data generated by the same animal over broken out by hour on the horizontal axis for each of several days of the feeding cycle.

As can be seen here, binary information is again provided via the horizontal axis showing presence in the feeder (element 405) but is expanded to depict the presence of a cow in the feeding zone at different points of time, organized by dates for six consecutive 24-hour periods (e.g., each of elements 451, 452, 453, 454, 455, and 456 represent a single 24 hour period).

Figure 5A:
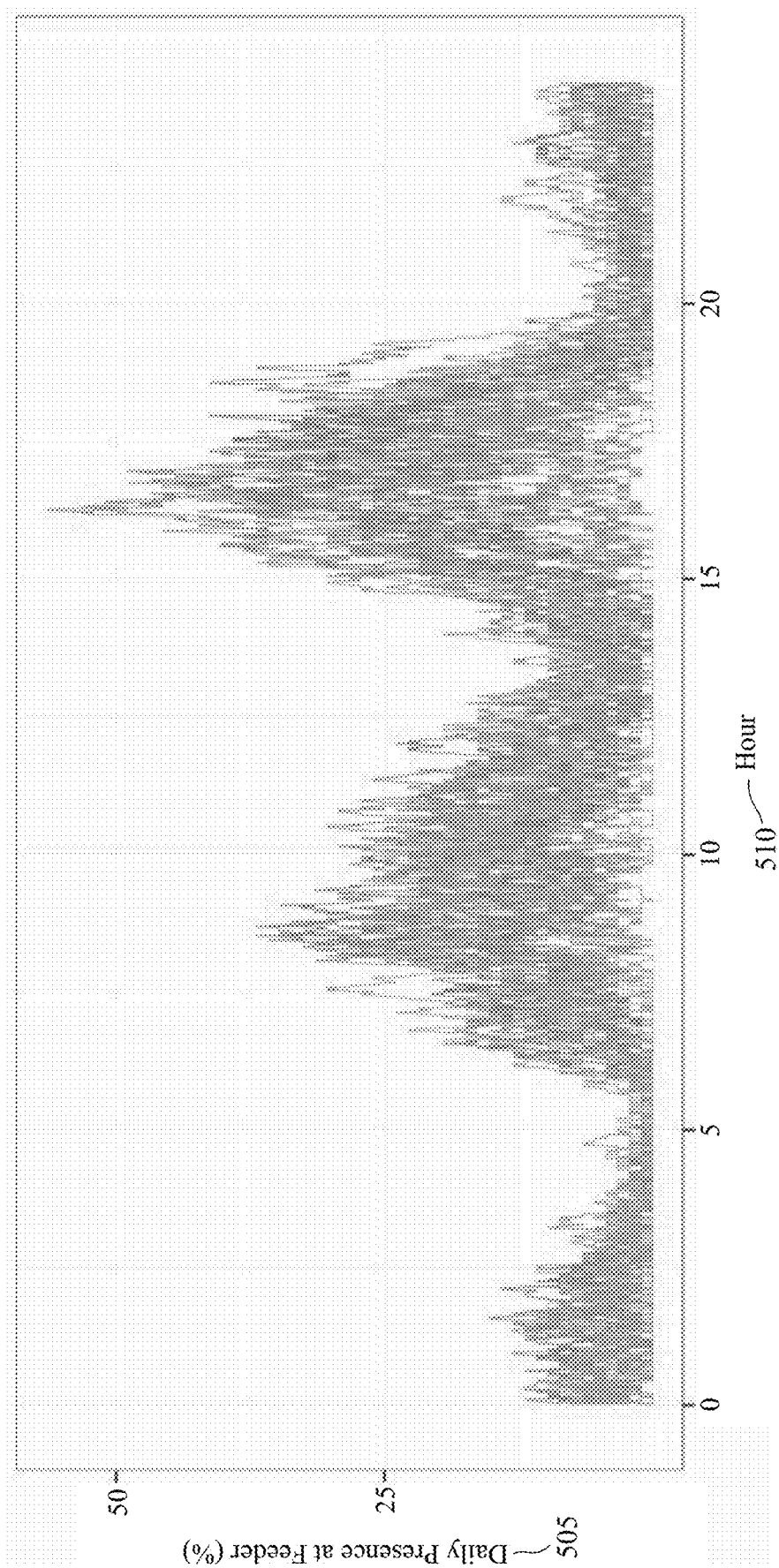
FIG. 5A shows a composite of cattle presence in a designated feeder zone on a percentage basis, in accordance with described embodiments.

FIG. 5A shows a composite of cattle presence in a designated feeder zone on a percentage basis. In particular, the vertical axis indicates the daily presence of a cow at a feeder over time represented per hour 510 via the horizontal axis. Each individual line on the composite graph depicts the presence of an individual cow at the feeder over time on a percentage basis.

Analysis of the graph readily depicts peak feeding times and times of general inactivity for the heard overall as well as system implemented analytics for the heard utilizing aggregated data while permitting for deeper analysis, outliers, and non-conforming behavior utilizing the per-cow data recorded for each of the cows within a given heard.

Figure 5B:
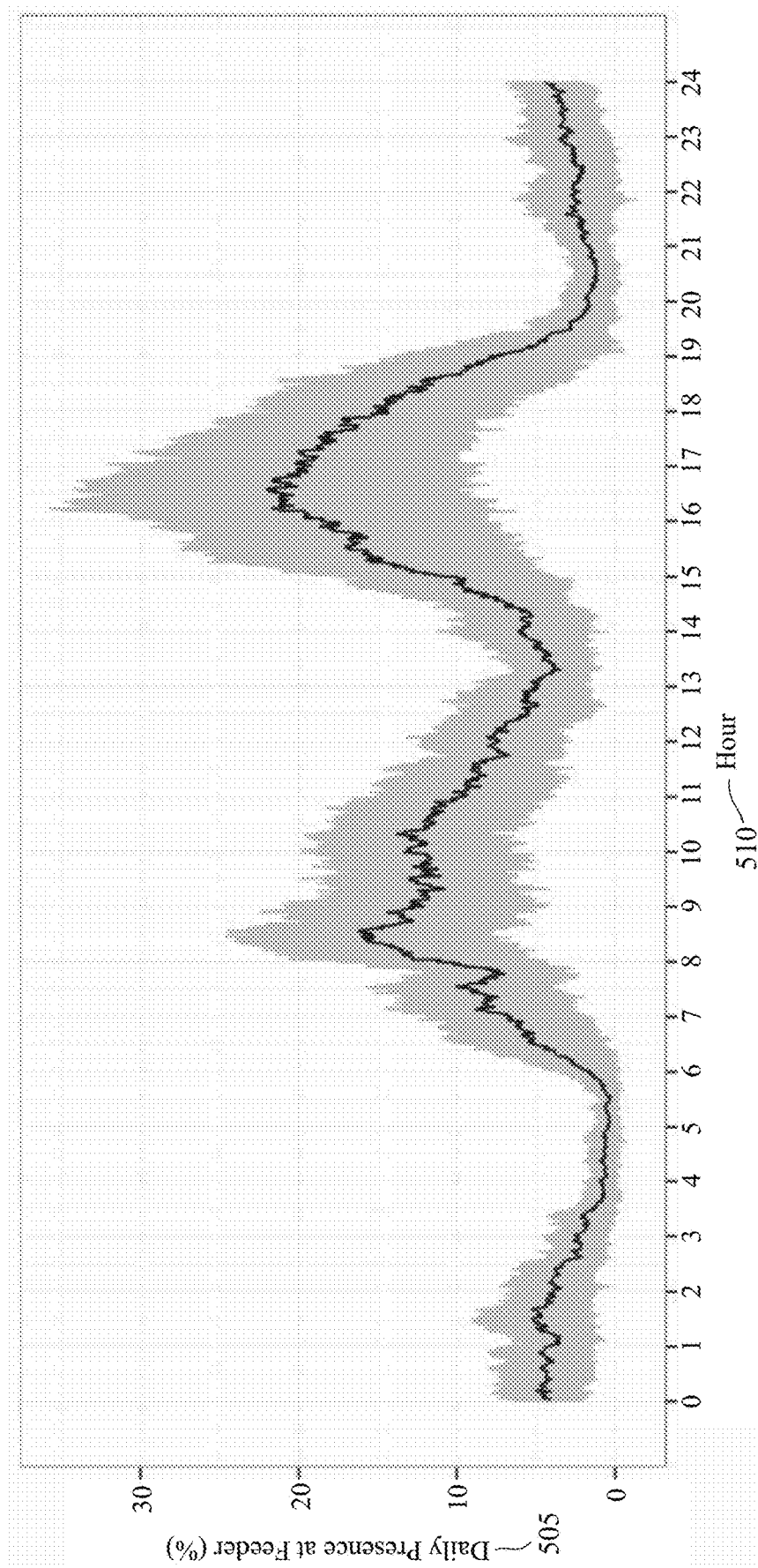
FIG. 5B shows an average and a standard deviation of cattle presence in a feeder, in accordance with described embodiments.

FIG. 5B shows an average and a standard deviation of cattle presence in feeder.

The information provided by the monitoring system, such as the information depicted at each of FIGS. 5A and 5B can be used by the system to automatically detect feeding patterns for individual cows that are anomalous with respect to the rest of the heard.

Figure 6A:
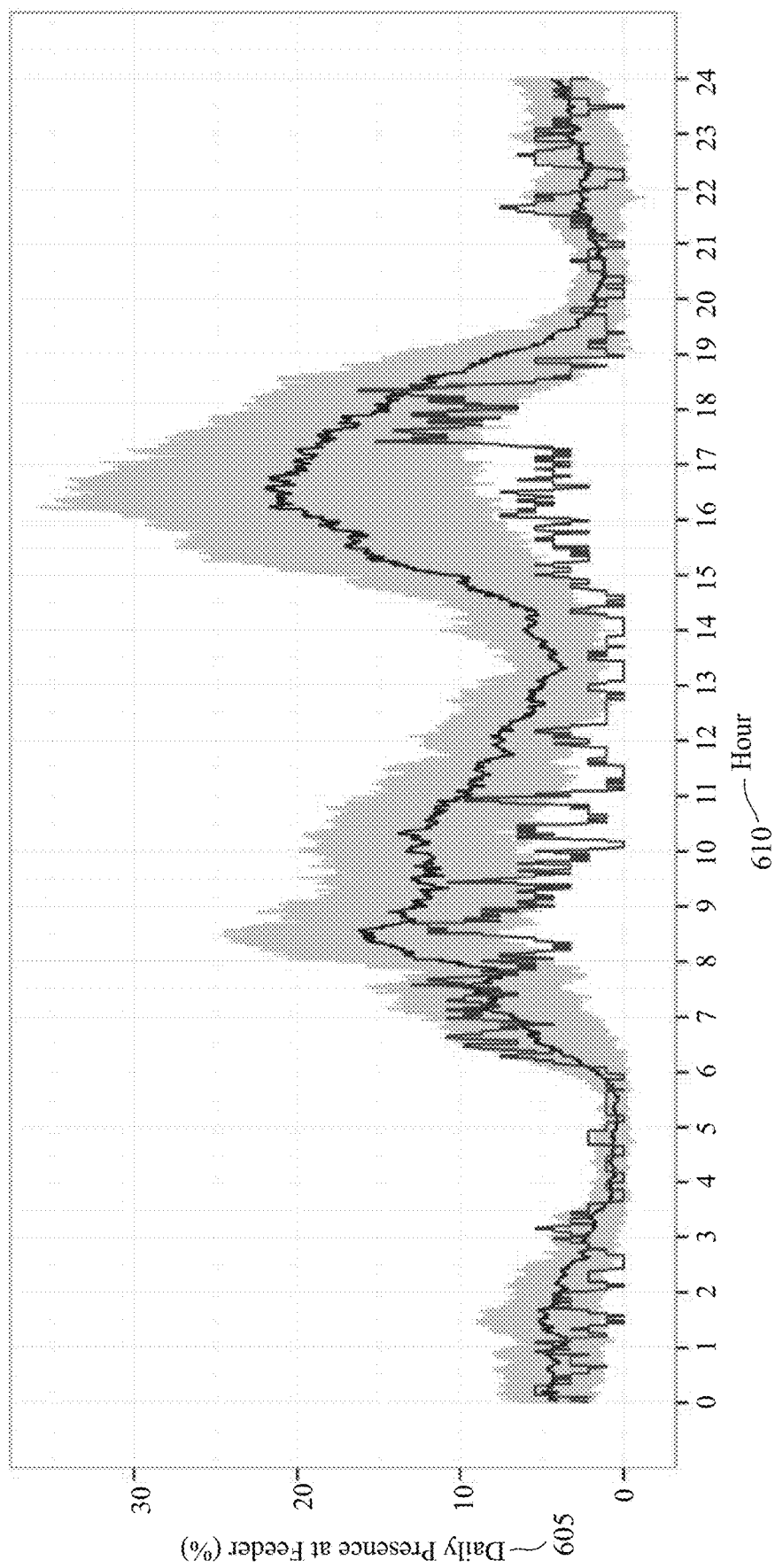
FIGS. 6A and 6B show anomalous feeding behavior for each of two cows based on their detected presence in the feeder via average and standard deviation formats respectively, in accordance with described embodiments.
Figure 6B:
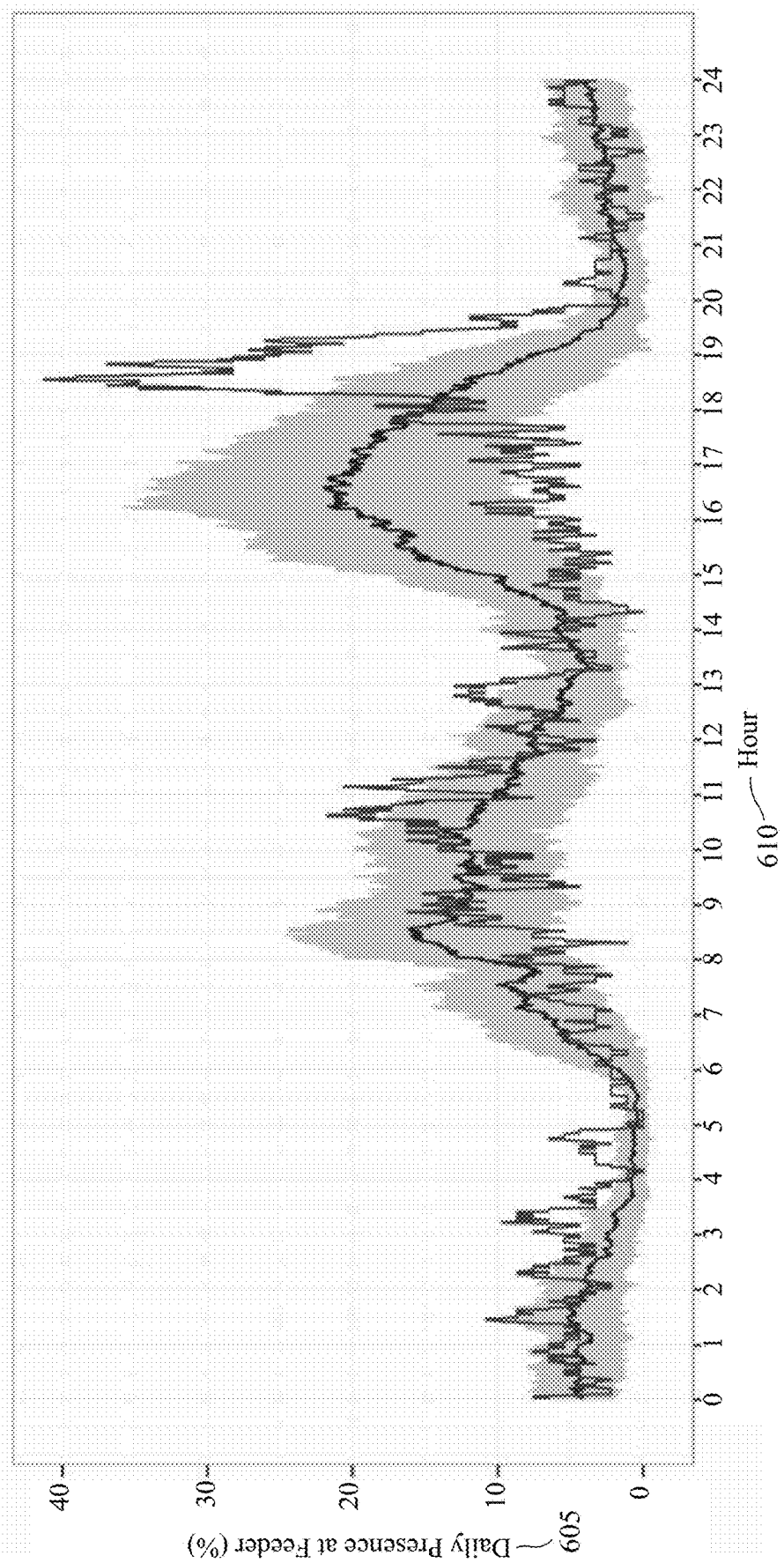

FIGS. 6A and 6B show anomalous feeding behavior for each of two cows based on their detected presence in the feeder via average and standard deviation formats respectively.

As depicted here, the timing of feeding for two cows are shown as compared to the rest of the herd. While the behavior of the two cows present peculiarities, it is the behavior depicted at FIG. 6B which clearly shows that the cow corresponding to the upper most line between hours 19 and 20 tends to eat after the rest of the cows have eaten, when there is likely little to no forage left in the trough.

For instance, the cow's behavior plotted at FIG. 6B tends to eat at 7 pm, over 2 hours after the most common feeding time for the rest of the heard which happens at around 4:30 pm. The information depicted in FIG. 6A also shows that this cow is "different" from the average cows in the heard (notice that some of the points are beyond the one standard deviation as indicated by the grayscale shadow).

The above figures and discussion thus illustrate how the data collected by the data gathering system can be used to identify and classify patterns. This identification and classification of patterns may is implemented on an automated and systematic basis by the system (e.g., element 100 of FIG. 1) while also permitting assisted analysis by exposing the raw data and the depicted graphs to users of the system. Such automated analysis is provided by the local transactional and analytical server (e.g., element 105 of FIG. 1A) in accordance with certain embodiments, which is configured to consume the incoming cow presence data from the various antennae and readers.

Once particular patterns are identified by the system, these patterns may then be utilized to make connections in two directions. Specifically, upstream connections may be made with the source of the problem and downstream connections may be made by associating the consequences of the pattern identified.

For instance, downstream consequences of a cow being "late" to the trough can include lower weight gain during the feeding cycle, lower quality of the beef harvested and higher morbidity of the cattle exhibiting the anomalous behavior exhibited by a particular cow and detected via the system's analytics. Upstream connections may include the source of the cattle, the type of feed being used for that head of cattle, the medicines administered to that head of cattle, etc. These upstream and downstream connections serve to unearth correlations and ultimately identify the underlying causes for the effects observed so that corrective or reinforcement measures may be undertaken to improve overall system efficiency for the feedlots being monitored.

The above analysis is conventionally performed as post mortem analysis which occurs after the cattle has finished its feeding cycle and possibly even after a cow has been slaughtered. However, through practice of the disclosed embodiments, it is possible to implement real-time and near real-time solutions via the described monitoring system that can alert feedlot operators of unusual patterns while a cow remains within its feeding cycle, with such information and the generated analytics being available to feedlot operators to make adjustments, prior to slaughter, to improve overall feedlot efficiency through improved animal health and through optimized feeding behaviors, given that such data is made available to the feedlot operators while the cows remain within the feeding cycle.

Stated differently, because real-time collection and analysis of the data is performed and exposed to the feedlot operators, it is thus possible to institute operational changes before slaughter, while the cow remains within its feeding cycle, thus improving feedlot efficiency, increasing profitability, and improving the health of the cow which in turn results in improved beef quality at harvest.

Such a system may perform its analysis based on statistical quality control, particularly through the use of statistical control charts, in which an exemplar system uses the real-time information provided by the system's sensors.

With regard to the monitoring system, use of the previously collected metrics may further be analyzed for the monitoring of the behavior of individual cows in the feeding zone of the pen. This permits feedlot operators to discover patterns that point to specific situations of concern.

For example, information from the monitoring system may be continuously analyzed and ultimately determine when a cow has reduced its feed intake below a threshold (e.g., based on aggregate time spent in the feed zone falling below a threshold) or determine when a cow has stopped its feed intake entirely, each of which may be a significant indicator of disease, thus warranting further investigation and feedlot operator intervention. By identifying and automatically triggering a notification based on the behavior of concern, it is possible for the feedlot operator to identify much earlier that anomalous behavior is present for one or more individual cows in the group, such that proper diagnosis and corrective actions may be implemented by the personnel in charge of the operations of the feeding lot. This is contrary to conventional feedlot systems in which human operators either become aware of a problem post-mortem due to low quality or unexpected weights or possibly due to the manual observation and flagging by veterinary services personnel or feedlot operators noticing such behavior. Realistically, however, manual detection simply is not feasible due to the large number of cows present multiplied by their varying feeding times and behaviors within a large scale operation.

Techniques used for the continuous monitoring and identification of these anomalies are thus provided utilizing the previously mentioned the RFID system which provides information regarding when, and for how long, each one of the cows being monitored are in the feeding zone of the pen, supported by automated analysis and notification triggers or alarms indicating cow behavior conditions which warrant further investigation.

Further still, there are other metrics that have shown to be useful to identify when there is a statistically significant shift in the behavior of a particular cow. For example, several summaries of the raw RFID sensors may be analyzed to determine additional metrics such as average time per visit to the feeding zone. Such a derived metric may be utilized as an input to statistical control charts to detect unusual conditions. Through this type of monitoring, the system effectively and autonomously detects situations where the cows suddenly change their feeding behavior, such as when an individual cow becomes ill.

Figure 7A:
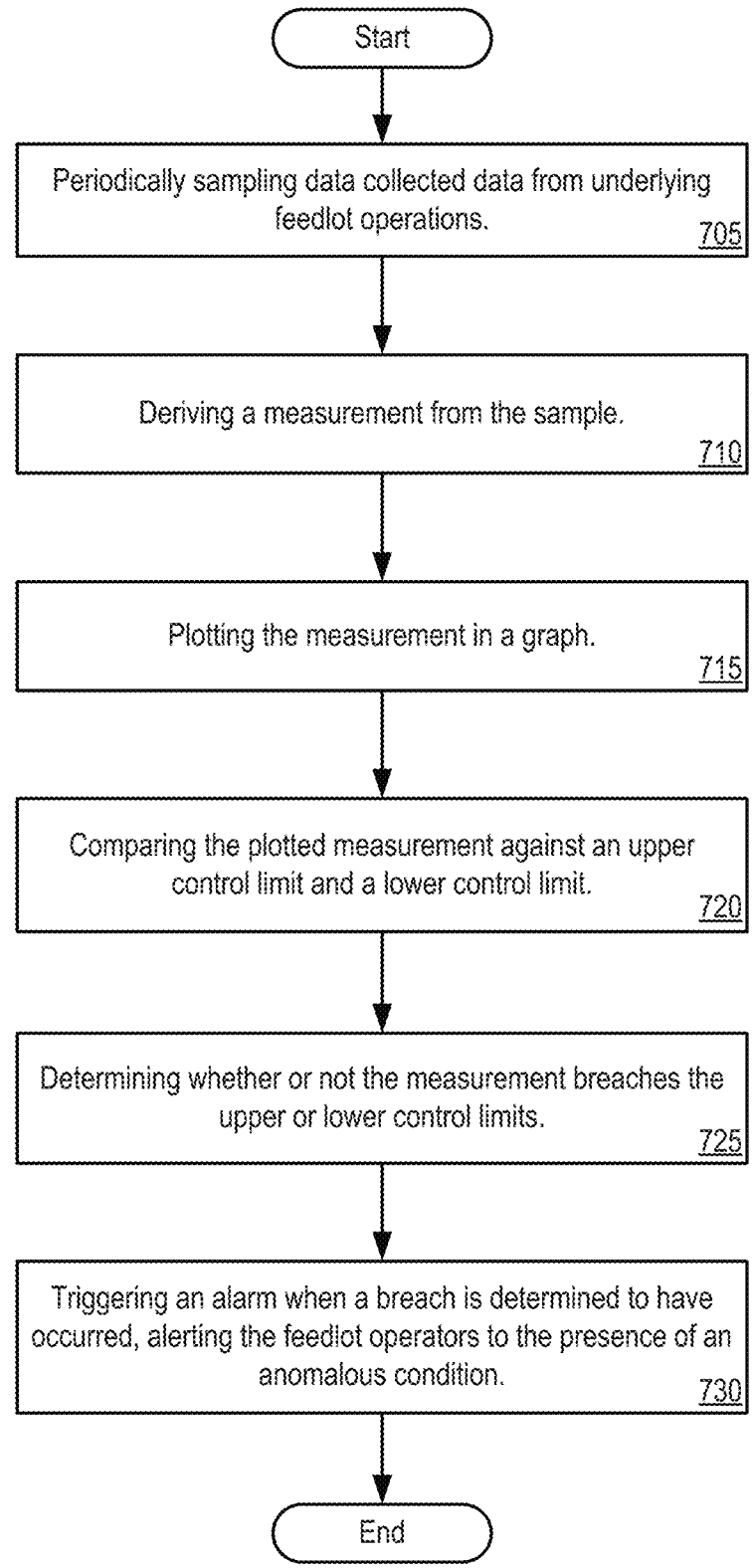
FIG. 7A depicts a method for implementing continuous monitoring, sampling, and automated alarm notification based on observed conditions, in accordance with one embodiment.

FIG. 7A depicts a method 700 for implementing continuous monitoring, sampling, and automated alarm notification based on observed conditions, in accordance with one embodiment.

Once the appropriate metrics are identified by the system, further processing may include continuous monitoring of the underlying system. Statistical control charts may be utilized as a supplemental tool for monitoring the performance of the system. Control charts have been used to measure the performance of operations in manufacturing areas as well as service operations and have also been used to monitor the behavior of pen-confined animals, such as the behavior of young pigs through a metric based on the consumption of water, in which it has been observed that young pigs showed a very consistent drinking pattern when they were healthy. Conversely, when young pigs are sick, a different drinking pattern emerges. Control charts may thus be utilized to monitor the drinking behavior with good predictive results of overall health. For instance, the analysis may detect patterns associated with certain conditions such as diarrhea even before obvious physical symptoms are exhibited by the animals, thus enabling the system to trigger notification and alarms of these conditions and permitting further investigation by the feedlot personnel responsive to the system alarms and notifications.

Further analysis may yield predictive results related to the monitoring of animals in confined spaces, such as swine, dairy and beef cattle. Control charts applied to input variables to monitor the feeding behavior of recently received steers may be utilized to detect morbidity in animals in a commercial feedlot. For example, a 3-hour feeding interval may be utilized to detect morbid animals resulting in advanced detection of animal morbidity, observed through testing to provide approximately 4 days earlier notification by the system versus conventional observation methods.

The use of control charts in conjunction with the described system may be summarized by the following operations: At block 705, the system periodically samples data collected data from underlying feedlot operations. At block 710, the system derives a measurement from the sample and at block 715, the system plots the measurement in a graph. At block 715, the system compares the plotted measurement against an upper control limit and a lower control limit, with the control limits being designed to accommodate most of the natural or common variability of the underlying feedlot operations to occur within the established control limits. Ultimately, the system at block 725 checks to determine whether or not the measurement breaches the upper or lower control limits and at block 730, the system triggers an alarm when such a breach occurs so as to alert the feedlot operators to the presence of an anomalous condition.

The practical application of control charts involves distinguishing between two types of variation. Specifically, the natural variation of the system and the variation caused by assignable causes. The property of control charts allows feedlot managers to understand the variation and behavior of the system studied. Use of such control charts further aids in the automated and systematic determination of whether the observed patterns of variation are indicative of a new trend in the process or indicative of random variation, similar to what has been observed in the past. Eliminating consideration of random variation ensures that operations are not disrupted more often than necessary by minimizing false alarms or erroneous triggering conditions.

Several performance measures may be utilized to evaluate whether a control chart is appropriately designed. The most common performance measures include the average run length, the probability of false alarms and the probability of not detecting an out-of-control or out-of-bounds situation.

The selection of the type of control chart depends on the characteristics of the system being measured. The particular characteristics of the system described herein include data with deviations from normality (non-normal distributions), outputs consisting of single measures (not an average) and the potential auto-correlation of the collected data. For instance, the following control charts may be utilized: The Shewhart Control Chart for Individual Measurements, Exponentially Weighted Moving Average (EWMA) for Individual Measurements and a Non-Parametric Control Chart. The EWMA Chart for Individual Measurements, in particular, is resilient to departures from normality, is robust to moderate levels of auto-correlation and can detect small changes in the process.

Thus, according to certain embodiments, the EWMA chart is utilized via the process operations 705 through 730, as depicted at FIG. 7. In general the parameters used in an EWMA control charts are given by the following equations one (1) through five (5), as follows:

$$Z_i = \lambda x_i + (1 - \lambda) Z_{i-1} \quad (1)$$

$$Z_0 = \mu_0 \quad (2)$$

$$UCL = \mu_0 + L\sigma \sqrt{\frac{\lambda}{(2-\lambda)}\left[1 - (1-\lambda)^{2i}\right]} \quad (3)$$

$$CenterLine = \mu_0 \quad (4)$$

$$LCL = \mu_0 - L\sigma \sqrt{\frac{\lambda}{(2-\lambda)}\left[1 - (1-\lambda)^{2i}\right]} \quad (5)$$

In equation 1, $x_i$ is the measurement to be monitored (such as the duration of the most recent feed visit to the trough) and $Z_i$ is the exponentially weighted average of the previous observations and the most recent observation, which has a weight of $\lambda$. Equation 2 sets the initial value of the metric as the mean of the process. When the mean is not known in advance, as it is the case in the application to be presented, the sample average is used in place of the mean. Equation 3 gives the computation of the upper limit of the control chart. In this equation, there are two unknown parameters, L and $\sigma$. L is a constant the represents the number of standard deviations from the center to which the upper control limit should be set; usually, L is set to three. Parameter $\sigma$ is the standard deviation of the population from which the observations are drawn. Because the parameters of the population are usually unknown, $\sigma$ is estimated from the data. Finally, equations 4 and 5 give the values for the center line and the lower limit of the control charts. This estimate may be obtained from an average moving range for individual observations.

The data points represented in the EWMA chart are decaying weighted sums of several data points, as shown in Equation (1). The weighted average depends on the parameter $\lambda$. This parameter is the rate of decay of the weights assigned to the past readings, and can take on values between 0 and 1. Observed experimental results indicate that a lambda value at 0.2 is appropriate so as to make the chart more robust to normality deviations and auto-correlation problems. The implementing control instructions and software configuration of the system may institute the lambda value at 0.2 as configurable default value or may dynamically vary the value over time.

A case study providing results of the application of EWMA control charts to the real data generated by the system's sensors is described above. Use of the control charts thus enables the system to systematically and automatically provide alerts when "unusual" conditions in the feeding behavior of individual cows are observed by the system. That is to say, for the disclosed application, there may be as many control charts as there are as cows with RFID tags, with each control chart being automatically generated and applied to the sampled data measurements. For implementation parameters, it has been observed that metrics which provide the best overall results in terms of type I (false positives) and type II (false negative) errors when utilized in conjunction with the control charts include: total feeding time per day and average time per-visit, per-day. Between these two observable metrics, the average time per-visit, per-day exhibited the best overall performance.

FIG. 7B depicts a flow diagram illustrating a method 701 for real-time beef cattle monitoring utilizing Radio-Frequency Identification (RFID) based technologies via a beef cattle monitoring platform.

Method 701 may be performed by processing logic that may include hardware (e.g., circuitry, dedicated logic, programmable logic, microcode, etc.), software (e.g., instructions run on a processing device) to perform various operations such as displaying, creating, establishing, triggering, transmitting, communicating, interfacing, instructing, receiving, assigning, synchronizing, exposing, loading, executing, operating, generating, storing, maintaining, returning, presenting, processing, providing, determining, updating, sending, etc., in pursuance of the systems and methods as described herein. Some of the blocks and/or operations listed below are optional in accordance with certain embodiments. The numbering of the blocks presented is for the sake of clarity and is not intended to prescribe an order of operations in which the various blocks must occur.

With reference to the method 700 at block 750, processing logic operates a database system storing data for heads of livestock, in which each head of livestock is individually identifiable via a Radio-Frequency Identification (RFID) tag affixed to each of the heads of livestock, the RFID tag uniquely identifying each of the heads of livestock to the system.

At block 755, processing logic reads information transmitted from the RFID tags via an antenna array formed from a plurality of antennas configurable to read the information upon any one or more of the heads of livestock entering a defined feeding zone.

At block 760, processing logic receives the information transmitted from the RFID tags and stores the information in the database system defining at least (i) a time of entry into the defined feeding zone and (ii) a time of exit from the defined feeding zone.

At block 765, processing logic analyzes the information stored in the database system to determine when each head of livestock is present within the defined feeding zone.

At block 770, processing logic monitors the heads of livestock for anomalous feeding behavior based on the analysis.

At block 775, processing logic triggers an automatic alert notification when the anomalous feeding behavior is identified for any one of the heads of livestock.

According to another embodiment of method 701, the defined feeding zone includes one of: a feeding trough; a feeding pen; a feed dispenser; and a feeding area isolated by a control point through which any head of livestock must pass to gain access to the feeding area.

According to another embodiment of method 701, the antenna array is configured as one of: a portal configuration for which the plurality of antennas form a reading arc at an entrance, exit, or control point through which any head of livestock must pass to gain access to the livestock's feed; an area configuration for which the plurality of antennas form irradiate a defined area or geographic segment of a feedlot facility into which any head of livestock must enter to gain access to the livestock's feed; and a shelf configuration for which the plurality of antennas form a three-dimensional pattern from which a reading volume is created at a feeder detecting and identifying each head of livestock individually at the time the RFID tag enters the feeder.

According to another embodiment of method 701, the RFID tag is affixed to each respective head of cattle by one of: a livestock ear tag having the RFID tag embodied therein at the time of manufacture; an earring affixed to each respective head of cattle capable of attaching with the RFID tag; an implantable pellet having the RFID tag embodied therein and affixed to the body of each respective head of cattle via a subcutaneous implant; and a wearable collar work by each respective head of cattle.

According to another embodiment of method 701, the antenna array formed from the plurality of antennas is further configurable to track a trajectory of each respective head of cattle through multiple defined zones of a feedlot including ingress and egress from the defined feeding zone.

According to another embodiment, the method further includes: storing directional pathing information in the database system defining either a traversed route or one or more zones through which each respective head of cattle has traversed in addition to (i) the time of entry into the defined feeding zone and (ii) the time of exit from the defined feeding zone.

According to another embodiment, the method further includes: determining the presence of each respective head of cattle within the defined feeding zone over time; and calculating a daily mean duration of time for each visit to the defined feeding zone by each respective head of cattle based on the information stored in the database system.

According to another embodiment, the method further includes: plotting the daily mean duration of time calculated for each visit to the defined feeding zone by each respective head of cattle into a control chart having an upper control limit and a lower control limit; and automatically triggering an alarm condition indicating anomalous behavior when the plot breaches one of the upper control limit or the lower control limit of the control chart.

According to another embodiment of method 701, the system implements a beef cattle monitoring platform. According to such an embodiment, the beef cattle monitoring platform executes via the processor and the memory of the system providing on-demand cloud based services to a plurality of subscribers; and in which each of the subscribers communicate with the beef cattle monitoring platform system via a computing device which is remote from the beef cattle monitoring platform and communicably interfaced with the beef cattle monitoring platform via a public Internet.

According to another embodiment, the method further includes: synchronizing the information stored in the database system to a cloud computing and data repository platform remote from a feedlot within which the antenna array is configured; and in which the synchronization is performed over a secure communication path traversing a public Internet.

According to another embodiment, the method further includes: applying statistical monitoring to identify morbidity within the heads of livestock monitored by the system; in which the statistical monitoring is to identify an animal exhibiting anomalous behavior selected from the group including: an aggressive animal within the heads of livestock monitored by the system; a shy animal within the heads of livestock monitored by the system; and a diseased animal within the heads of livestock monitored by the system; and in which the system is to trigger an alert for corrective behavior by a feedlot operator upon detection of the anomalous behavior.

According to another embodiment, the method further includes: analyzing the information stored in the database system using a control chart for Individual Measurements, Exponentially Weighted Moving Average (EWMA) to identify one or more of the heads of livestock cattle exhibiting anomalous behavior versus the herd or group consisting of the heads of livestock as monitored by the system.

According to another embodiment of method 701, the heads of livestock constitute one of: beef cattle livestock; dairy cow livestock; and sheep livestock.

According to a particular embodiment, there is a non-transitory computer readable storage medium having instructions stored thereupon that, when executed by a system having at least a processor and a memory therein, the instructions cause the system to perform operations including: operating a database system storing data for heads of livestock, in which each head of livestock is individually identifiable via a Radio-Frequency Identification (RFID) tag affixed to each of the heads of livestock, the RFID tag uniquely identifying each of the heads of livestock to the system; reading information transmitted from the RFID tags via an antenna array formed from a plurality of antennas configurable to read the information upon any one or more of the heads of livestock entering a defined feeding zone; receiving the information transmitted from the RFID tags and storing the information in the database system defining at least (i) a time of entry into the defined feeding zone and (ii) a time of exit from the defined feeding zone; analyzing the information stored in the database system to determine when each head of livestock is present within the defined feeding zone; monitoring the heads of livestock for anomalous feeding behavior based on the analysis; and triggering an automatic alert notification when the anomalous feeding behavior is identified for any one of the heads of livestock.

Figure 8A:
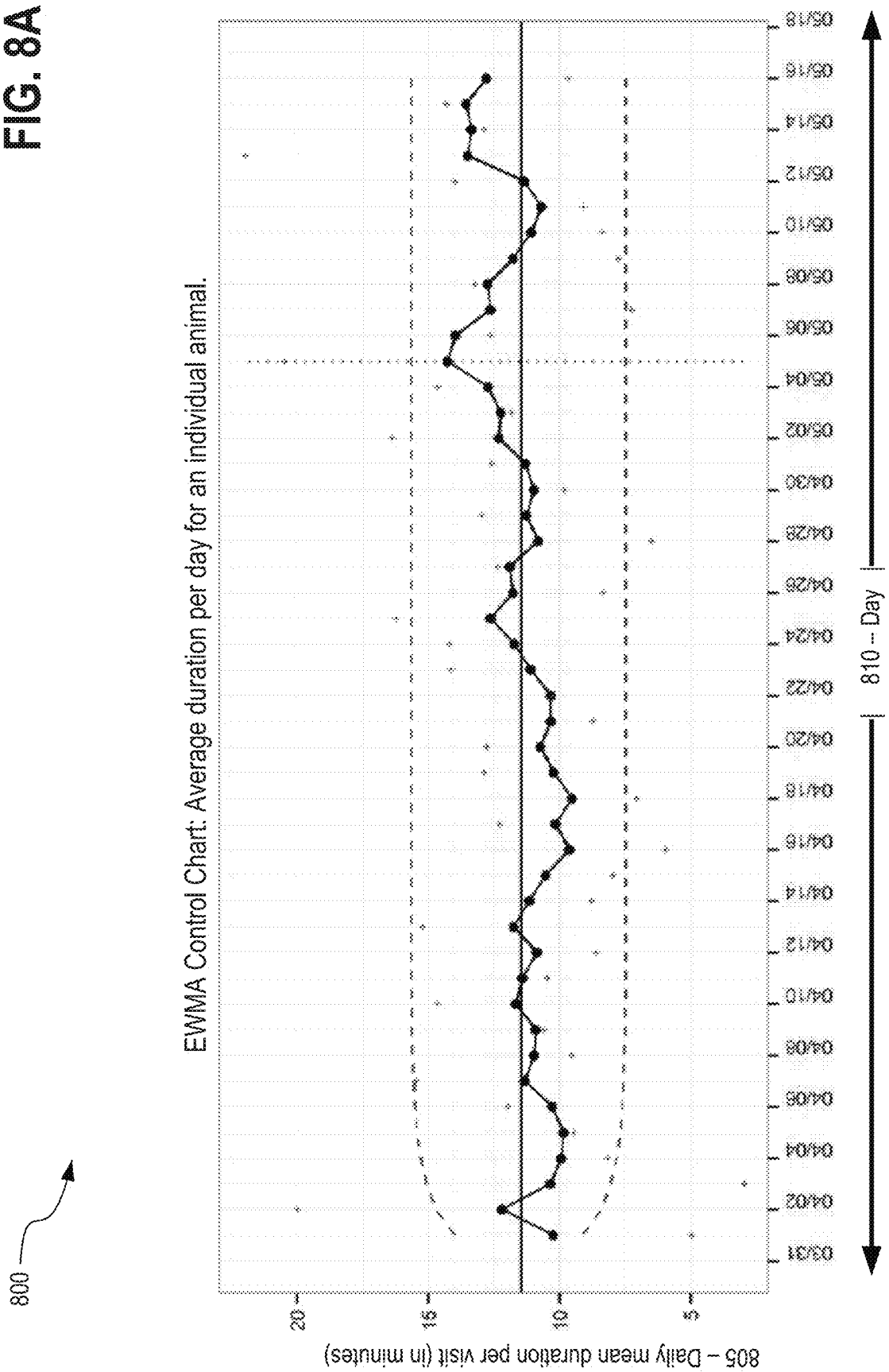

FIGS. 8A and 8B depict EWMA control charts 800 and 801 showing the individual observations of an individual animal as well as the metrics being used by each chart respectively.

Beginning with FIG. 8A, the depicted EWMA control chart depicts the average duration per day for an individual animal. Here, each individual observation refers to the daily average time (in minutes) as depicted by element 805 on the vertical axis, that an animal being monitored spent in the feeding zone of the pen per visit (on average in minutes). Each observed metric corresponds to the EWMA of average time per visit per day, with the range of individual days being marked along the horizontal axis at element 810. In this case, the process being monitored is considered to be in state of statistical control since no points of the metric fall outside the control limits and no unusual patterns in the chart are detected.

Turning to FIG. 8B, there is further depicted an EWMA control chart showing an anomalous condition having been identified for a cow diagnosed with uterine prolapse. As before, the horizontal axis shows the daily mean duration per visit in minutes at element 805 and the horizontal axis shows the range of individual days at element 810. Additionally depicted is an upper control limit 812 for the chart and a lower control limit 813 for the chart, with the lower control limit 813 having been breached by a plotted measurement on the graph, thus resulting in the trigger condition 815, responsive to which the system may be configured to automatically trigger an alert, alarm, or other notification to the feedlot operators (e.g., via SMS text, email, via a GUI notification to the dashboard at element 110 of FIG. 1A or the cattle work station at element 115 of FIG. 1A, etc.).

While the system does not directly diagnose any individual cow with the uterine prolapse condition, it does infer the condition or at least infer an anomalous condition for the cow and thus trigger an alert or other notification. Specifically, as shown here, there is a correlated anomalous condition marked by the EWMA control chart's non-conforming measurement, responsive to which the system may automatically trigger an alarm or other alert notification.

Other control charts represent cases when the metric falls outside the control limits and unusual point patterns are present. For instance such control charts may identify and correspond to cattle with mastitis or other conditions of concern which will correspond to non-conforming behavior of the individual cow versus the larger group of cows within which the cow is present. The graphs thus present points out of the control limits 812 and 813 and unusual patterns identifiable within the upward and downwards trends.

The implementation of the dynamic part of the integrated feed management system described above thus illustrates that it is possible to detect illnesses affecting the cattle in a feedlot even before the trained technical personnel become aware of the first symptoms. This is due to the combination of the information provided by the RFID sensors and the use of the described statistical control procedures. According to further embodiments, such a dynamic system is realized by connecting the monitoring capabilities to an advanced analytics system, thus creating a closed-loop system to identify and classify behavior patterns corresponding not only to illnesses but also to other underlying causes of bad feedlot performance such as cows not being socially compatible with the rest of the heard or genetically underperforming cattle.

According to certain embodiments, the monitoring system may operate locally whereas the analytics system operates within a cloud based system providing services to subscribers, including providing the advanced analytics. In other embodiments, the data collection occurs locally and the raw data, including continuous measurements by the hardware antennas and readers, are transmitted to the cloud based system which performs all data storage, aggregation, analysis, triggering, reporting, and management operations, including transmitting GUIs to the work terminals and dashboards which may be co-located with the feedlot or which may be remote from both the cloud based service provider and also remote from the feedlot operation.

Figure 9:
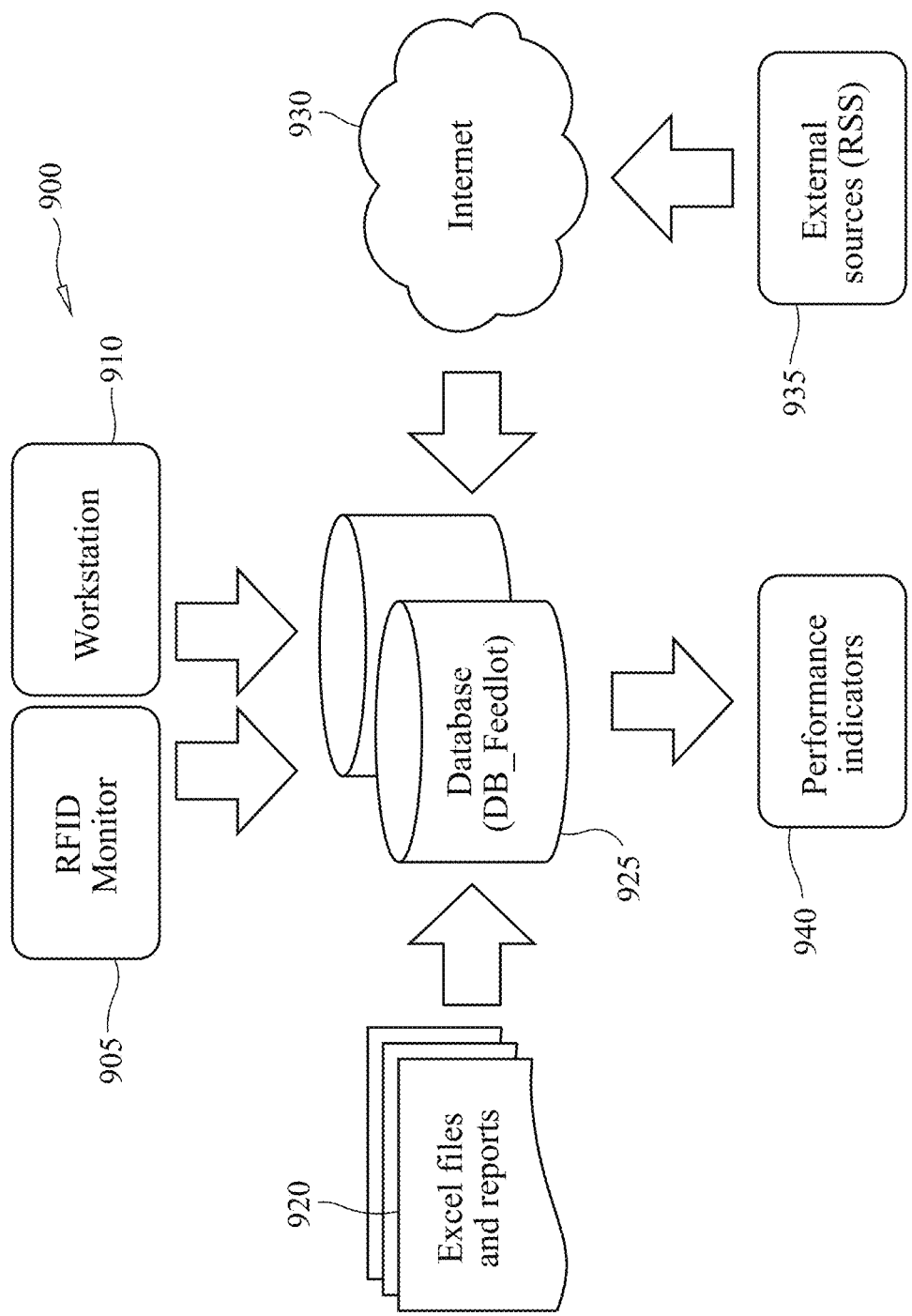
FIG. 9 depicts an exemplary architecture for implementing described embodiments.

FIG. 9 depicts an exemplary architecture for implementing described embodiments. As shown here, there is a database (e.g., DB Feedlot) which operates in communication with the RFID monitor 905, workstation 910, each of which may provide inputs into the database system 925. Further depicted are the excel files and reports 920 as well as data entry provided by feedlot operators utilizing GUIs displayed to the workstations 910, each of which also provide inputs into the database system 925. Still further, communication with a public Internet 930 is provided via which the database system 925 may receive inputs from external sources 935 (e.g., an RSS feed) and third party sources. For example, input data such as such as weather information may be captured by the database system 925 in this manner.

The database system 925 is depicted as outputting performance indicators 940 or KPIs which are fed as output to dashboards and various operator workstations and optionally may be output over the public Internet 930 to permitted and authenticated entities configured to receive such information.

Information is key to developing better models and for the success of overall cattle-monitoring systems and methodologies such as those described above; hence the importance of designing and implementing an effective data acquisition system.

The purpose of the data acquisition system is to integrate into a database system, all the data which may be useful to study the behavior and performance of the cattle in a monitored feedlot. This includes feeding habits, treatments (implants, medications, etc.), weight performance, final product quality, as well as external factors that, while perhaps not directly controllable, will nevertheless affect the performance of the feeding process (e.g., ambient temperature, humidity, etc.).

The data acquisition system thus integrates information from different sources, including:
  Internal sources of information: Systems and databases that are part of the company's IT infrastructure, including:
   a. ERP systems;
   b. Internally developed systems for specific processes administration (e.g., feedlot administration system, extended manufacturing system, among others); and
   c. Files and spreadsheets used during operational processes (e.g. cattle segmentation, weightings), as well as slaughter reports.
  External sources of information: Public sources of information, which provide specialized information on a specific topic, such as regional weather data sources available on different weather information websites.
  Generation and logging of new data: As detailed data related to the behavior and feeding habits of livestock is required, the tools described herein permit the detailed and granular data to be captured and persistently stored for real-time and subsequent analysis. The system collects data from different sources and also generates data itself pursuant to analysis and ongoing monitoring of available sensors and readers of the system. Use of RFID (Radio-frequency Identification) technologies are utilized in accordance with certain embodiments for the monitoring of livestock movements through established "zones" and to track the location over time for the monitored animals in a non-invasive manner and without impacting the regular behavior of the animals.

Data collection system: Provides a comprehensive database system that contains detailed information about the intensive feeding process stages during beef cattle production, as well as to identifies through the collected data, relationships between the different subsets of such data that allows conducting cross-referencing.

Quality and reliability of information: The quality and integrity of the data warehousing standards are observed due to the impact data quality has on research results as well as the ability to monitor and trigger alerts in real-time.

During the preliminary analysis of the data from the production sources, several parameters were optimized, including:

a) The multiplicity of ID codes: Because there are several systems working at different operating phases, the several identification codes initially used were optimized through a reduction of the total different types of ID codes so as to improve or eliminate the need for cross-referencing between systems.

b) Standards were optimized: Specifically, when production work orders are made, codes and folios are generated under a standard pattern.

c) Missing data eliminated: Missing files, missing periods, empty records, etc., present noise in the system and reduce the quality of predictive results and therefore, safeguards are implemented to avoid such incomplete records.

A data collection procedure is thus provided which guarantees the capture of key information supported by design mechanisms to validate the information collected.

Security: Due to the private nature of some data sets collected, data encryption may be used within the storage databases.

Availability: Information availability is as important as data security providing both proper and timely access to the data as required by the users or processes. Information availability is accomplished by local implantations by ensuring maintenance policies on the database and hardware are observed, as well as to adequately program backups, whereas cloud based solutions leverage the redundancies and system resilience provided by those third party solutions.

A database system design is therefore provided a particular embodiment having the unique attributes and features noted above with at least the following fields being tracked and available to be analyzed:

| Tbl_Usuarios | | Contains the list of users that will use the system |
|---|---|---|
| PK_usuario | bigint | Key and user identifier |
| Nombre | varchar(50) | Username |
| Apellido | varchar(50) | User last name |
| Puesto | varchar(50) | User job position |
| Usuario | varchar(10) | Login name |
| Password | varchar(10) | Login password |
| Admin | bit | (True/False) Indicates whether the user has administrative permissions or not, i.e. to modify configurations. |
| Activo | bit | (True/False) Indicates if the user is active or inactive. |
| Ath_corrales | bit | (True/False) Indicates if the user has permission to make modifications in pens. |
| Ath_ordenes | bit | (True/False) Indicates if the user has permission to make changes to work orders. |
| Ath_catalogos | bit | (True/False) Indicates if the user has permission to make changes in catalogs. |
| Ath_loteo | bit | (True/False) Indicates if the user has permission to make changes in the lots. |
| Ath_rastro | bit | (True/False) Indicates if the user has permission to use the module. |
| Ath_reportes | bit | (True/False) Indicates if the user has permission to access the reports. |

| CTL_TRATAMIENTOS | | Administered treatments catalog |
|---|---|---|
| PK_Tratamiento | bigint | Key and treatment identifier |
| FK_Tipo_Tratamiento | bigint | Treatment identifier (treatment classification) |
| Tratamiento | varchar(30) | Treatment name |
| Activo | bit | (True/False) Indicates whether the treatment is active or inactive. |

| CTL_TIPO_TRATAMIENTOS | | Treatments classification catalog |
|---|---|---|
| PK_Tipo_Tratamiento | bigint | Key and treatment identifier |
| Tipo_Tratamiento | varchar(50) | Treatment classification description |
| Activo | bit | (True/False) Indicates whether the classification is active or inactive. |

| CTL_TIPO_TRABAJOS | | Works catalog |
|---|---|---|
| PK_Tipo_Trabajo | bigint | Key and work identifier |
| Tipo_Trabajo | varchar(50) | Work description |
| Activo | bit | (True/False) Indicates whether the work is active or not. |

| CTL_SEXO | | Livestock gender catalog |
|---|---|---|
| PK_Sexo | bigint | Key and gender identifier |
| Codigo_sexo | varchar(5) | Code or short gender description |
| Sexo | varchar(15) | Gender description |
| Predeterminado | bit | (True/False) Indicates if this will be a default value for the cattle registration |
| Activo | bit | (True/False) Indicates whether the work is active or not. |

| CTL_RAZAS | | Breeds catalog |
|---|---|---|
| PK_raza | bigint | Key and breed identifier |
| Codigo_raza | varchar(5) | Code or breed key name |
| Raza | varchar(50) | Breed description |

| CTL_RAZAS | | Breeds catalog |
|---|---|---|
| Predeterminado | bit | (True/False) Indicates if this will be a default value for the cattle registration |
| Activo | bit | (True/False) Indicates whether the description is active or not. |

| CTL_PROVEEDORES | | Livestock suppliers catalog |
|---|---|---|
| PK_Proveedor | bigint | Key and supplier identifier |
| Proveedor | varchar(100) | Supplier description |
| PK_Origen | bigint | Livestock origin indicator |
| Activo | bit | (True/False) Indicates whether the supplier is active or inactive. |

| CTL_PROCESOS | | Fattening process catalog, order, and estimated duration |
|---|---|---|
| PK_Proceso | bigint | Key and process identifier |
| Proceso | varchar(20) | Process description |
| estimado_programa | int | Estimated duration |
| orden | int | Order regarding other processes |
| Activo | bit | (True/False) Indicates whether the process is active or inactive |

| CTL_ORIGENES | | Livestock origins catalog |
|---|---|---|
| PK_Origen | bigint | Key and origin identifier |
| Codigo_Origen | varchar(10) | Code or origin key name |
| Estado | varchar(25) | Supplier state name |
| Activo | bit | (True/False) Indicates whether the origin is active or inactive. |

| CTL_EDADES | | Catalog of cattle ages |
|---|---|---|
| PK_edad | bigint | Key and age identifier |
| N_paletas | varchar(5) | Palettes number which indicates the animal estimated age |
| Edad | varchar(15) | Estimated age |
| Predeterminado | bit | (True/False) Indicates if this will be a default value for the cattle registration |
| Activo | bit | (True/False) Indicates whether this option is active or inactive |

| CTL_CORRALES | | Pens' features and catalog |
|---|---|---|
| ID | bigint | Key and pen identifier |
| Descripcion | varchar(50) | Pen description, code or name |
| Capacidad | int | Maximum capacity |
| Poblacion_H | int | Female population |
| Poblacion_M | int | Male population |
| Oldest | datetime | Entry date of the oldest animal |
| Alert | bit | (True/False) Indicates whether the system has generated an alert for the user |
| Disponible | bit | (True/False) Indicates if the pen is available or is in use |
| Habilitado | bit | (True/False) Indicates if the pen is enabled or disabled for some reason |

| CTL_CORRALES | | Pens' features and catalog |
|---|---|---|
| Activo | bit | (True/False) Indicates if the pen still exists |
| Comentario | varchar(200) | Additional comments on the pen characteristics |

| CTL_CLASIFICACIONES | | Meat grading catalog (with which channels are evaluated after the sacrifice) |
|---|---|---|
| PK_Clasificacion | bigint | Key and grading identifier |
| Clasificacion | varchar(25) | Grading description |
| Activo | bit | (True/False) Indicates if the grading is active or inactive |

| CRR_INV | | This table contains the current stock as well as the livestock characteristics within each of the pens. Includes a bovine - pen relation |
|---|---|---|
| PK_C | bigint | Key and relation identifier |
| Arete | varchar(50) | Bovine tag identifier code |
| Tipo_A | bigint | Indicates the type of tag that is being used (State/SINIIGA) |
| RFID_Tag | varchar(50) | RFID tag identifier code |
| Fecha_Registro | datetime | Bovine registration date |
| FK_Proveedor | bigint | Identifier of the supplier to whom the bovine was purchased |
| FK_Origen | bigint | Identifier of the origin |
| FK_Edad_Recibo | bigint | Identifier that indicates the age the animal had when it was received |
| FK_Raza | bigint | Identifier of the breed |
| FK_Sexo | bigint | Identifier of the gender |
| FK_Lote | bigint | Identifier of the lot to which it belongs |
| N_Cons_Lote | int | Lot consecutive number, used for internal control; it is written in the identifier tag |
| FK_Corral | bigint | Identifier of the assigned pen |
| Ult_Peso | float | Last registered weight |
| Sacrificado | bit | (True/False) Indicates if the bovine was already slaughtered or not |
| N_Canal | int | Indicates channel number; it is used as a control number at the slaughterhouse. |
| Peso_Pie | float | Weight of animal before slaughter |
| Peso_Caliente | float | Weight of animal after slaughter |
| Peso_Frio | float | Cold carcass weight |
| Peso_Pieles | float | Weight of bovine skin |
| FK_Clasificacion | bigint | Identifier of the grading it has been given |

| CRR_CLOG_PROCESOS | | This table contains the activity record on the execution of the different processes within the feedlot |
|---|---|---|
| PK_CLOG_PROCESOS | bigint | Unique registry index |
| FK_C | bigint | Indicator of the animal, lot and pen under processing |
| FK_PROCESO | bigint | Identifier of the process that is being executed |
| FECHA | datetime | Execution date |
| PESO | float | Animal weight during the process |

| CRR_CLOG_PROCESOS_TRATAMIENTOS | | This table contains the treatment record that has been performed on the animals during the different processes within the feedlot |
|---|---|---|
| PK_CLOG_TRATAMIENTO | bigint | Unique registry index |
| FK_CLOG_PROCESO | bigint | Identifier of the process registry in which the treatment was performed |
| FK_TIPO_TRATAMIENTO | bigint | Identifier of the type of performed treatment (classification) |
| FK_TRATAMIENTO | bigint | Identifier of the performed treatment |

| CRR_CMOV_CORRALES | | This table contains the livestock movements among the pens |
|---|---|---|
| PK_CLOG_MOV | bigint | Unique movement index |
| FOLIO_MOV | varchar(15) | Work order number where the movements are being requested |
| FK_CORRAL_ORIGEN | bigint | Identifier of the pen where the movement is originated |
| FK_CORRAL_DESTINO | bigint | Identifier of the pen where the animal will be located |
| FECHA | datetime | Movement date |
| MOV_PARCIAL | bit | (True/False) Indicates if the movement was complete, individual or partial |

| CRR_CMOV_CORRALES_DET | | This table contains the relation of the related animals in each of the movements among the registered pens |
|---|---|---|
| PK_CLOG_MOV_DETALLE | bigint | Unique registry index |
| FK_CLOG_MOV | bigint | Movement identifier |
| FK_C | bigint | Involved cattle identifier |

| CRR_LOTES | | In this table, initial production lots are registered |
|---|---|---|
| PK_Lote | bigint | Unique lot identifier |
| cod_lote | bigint | Lote code, number that is used for internal processes |
| fecha_llegada | datetime | Arrival date of the animals that forms the lot |
| fecha_loteo | datetime | Lot creation date |
| rendimiento | varchar(50) | Lot average performance |
| cerrado | bit | (True/False) Indicates if the lot still exists |
| fecha_cierre | datetime | Indicates the date when the lot was closed (Sent for slaughter) |

| CRR_ORDENES | | In this table, all lots and pens work orders are registered |
|---|---|---|
| PK_Orden | bigint | Key and work order identifier |
| folio | varchar(15) | Order number generated for the work order registry |
| Fecha | datetime | Date on which the work will be performed |
| FK_usuario | bigint | Unique identifier of the user who generated the work order |

| CRR_TRABAJOS | | This table records the tasks that comprise the work orders |
|---|---|---|
| PK_Trabajo | bigint | Key and work identifier |
| FK_Orden | bigint | Unique identifier of the belonging work order |
| Folio | varchar(15) | Order number generated for the work |
| FK_Tipo_Trabajo | bigint | Identifier that classifies the type of work to be performed |
| FK_Proceso | bigint | Identifier that specifies the process that is being performed within the feedlot |
| Cerrada | bit | (True/False) Indicates whether the work is complete or incomplete |
| FK_empleado | bigint | Unique identifier of the user who performed the work |

| CRR_TRABAJOS_DET | | This table contains a detailed registry of every work. Lot details, as well as the number of animals, the pen where the work will be done, observations, etc. |
|---|---|---|
| PK_Trabajo_Detalle | bigint | Key and detail identifier |
| FK_Trabajo | nchar(10) | Registry work identifier |
| FK_Orden | bigint | Work order identifier |
| FK_Coral_Origen | bigint | Destination pen identifier of where the animals will be collected for working on them |
| FK_Lote | bigint | Identifier of the pen to which the animals that will be worked belongs to. |
| Cantidad_H | int | Number of females to work on |
| Cantidad_M | int | Number of males to work on |
| FK_Corral_Destino | bigint | Unique identifier of the pens where the cattle will go after the work has been done |
| Observaciones | varchar(150) | Observations recorded by the operator |
| Realizado | bit | (True/False) Indicates if the work has been completed or not |

| CRR_TRABAJOS_TRAT | | In this table, a registry of the applied treatments is stored |
|---|---|---|
| PK_Trabajo_Trat | bigint | Key and registry identifier |
| FK_Trabajo | bigint | Unique identifier of the performed work |
| FK_Orden | bigint | Unique identifier of the work order in which the treatment was specified |
| FK_Lote | bigint | Lot unique identifier to which the treated animals belong to |
| FK_Tratamiento | bigint | Unique identifier of the performed treatment |

| Actividad_Corrales | | This table saves the information collected by the RFID system, recording the animals' activity in the feeders as well as their presence in it |
|---|---|---|
| Id | bigint | Table index |
| Id_reader | bigint | Identifier of the RFID reader that took the reading |
| Tag | varchar(30) | Electronic ID tag code |
| Time | datetime | Time of day in which the animal was at the feeders |

| CLT_REF | | This table contains the relation among the different identifiers (tag printed code, RFID programmed code) as well as the relation between the readers that monitors the lots |
|---|---|---|
| ID_vaca | bigint | Cattle unique identifier |
| RFID | nchar(30) | Unique identifier of 24 hexadecimal characters |
| TAG_ID | nchar(20) | Tag identifier (printed code) |
| TAG_R17 | varchar(10) | Internal identifier (Rancho 17) |
| Lote | numeric(18,0) | Lot number to which the animal belongs |
| Id_lector | bigint | Identifier of the reader that is monitoring the lot |

Activity per minute query: SQL Transact, an industry-standard language to perform queries from related tables, is used to perform database queries.

A database maintenance program preserves the integrity of the collected data at the database. Certain embodiments implement the following maintenance tasks: Database integrity review which is a process that follows certain rules, this enables to analyze the relations created between the different data tables that make up the database. This task ensures that the records of the related tables are valid. The analysis is scheduled as part of a maintenance program which runs periodically. Once the data integrity has been verified and as part of the maintenance program, the system creates a backup of the database. This backup is scheduled as part of a maintenance program that runs periodically.

According to described embodiments, the system generates data from the feeding process operations as well as from the activity of the cattle at the pens. To this end, sensors and monitoring equipment may be utilized, along with individual workstations, which permit the capture of additional information from GUIs presented to feedlot operators at the workstations. According to certain embodiments, the workstations may be located in the individual processing areas within the feedlot, allowing for transmission of the generated data while also enabling the feedlot operators to control and monitor the devices.

According to certain embodiments, additional environmental conditions such as dust, humidity, and heat are mitigated via communication links co-located with the feedlot pens via which certain operator workstations may additionally be communicably interfaced.

Certain embodiments enhance security for the network traffic generated by the RFID readers through use of a private network designed to exclusively permit only the traffic associated with affirmatively identified sensors, readers, workstations, and other network components which operate in support of the system. That is to say, a foreign and unannounced network component or communication node will be prohibited from communicating with the system or its various components. Access to such permitted devices is thus restricted and one or more secure routers are utilized as a bridge to communicate with any outside networks operating outside of the VPN.

Antenna setup: An antenna which supports a wide range of configurations is utilized according to the described embodiments, as such an antenna enables a wide range of implementation parameters and configurations without having to acquire different hardware. These include an area configuration, which is used for the location of assets by means of irradiation of areas or by segmenting geographically a facility. A portal configuration, for which a reading arc is created at entrances, exits, and control points in order that a tagged asset (e.g., a cow having been tagged with an RFID) is detected when passing through the arc. A shelf configuration, which is a configuration that creates a three-dimensional pattern, which detects everything within regardless of its position, which is ideal to detect several assets in a given space, often utilized by automated inventory systems. The shelf type configuration is preferred for livestock monitoring at the feeder according to certain embodiments, such a configuration creates a reading volume at the feeding area, detecting and identifying animals individually at the time their heads enters the feeder and, consequently, the RFID reading space.

FIG. 10 illustrates a diagrammatic representation of a system 1000 for implementing real-time beef cattle monitoring utilizing Radio-Frequency Identification (RFID) based technologies, depicted in the exemplary form of a computer system, in accordance with one embodiment. Such a system 1000 utilizes a set of instructions, for causing the system or machine 1000 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes an RFID data analysis engine 1024, such as an analysis engine to evaluate incoming data streams collected from the peripheral devices

1036 such as the RFID tags (e.g., via an antenna), and an RFID data collection engine 1023 to manage the incoming data (e.g., write such data to a database) and generated action triggers 1025 by which to alert the farm operator or manager of a cow needing intervention due to sickness or non-optimal feeding observations, in furtherance of the embodiments as described herein. Main memory 1004 and its sub-elements are operable in conjunction with processing logic 1026 and processor 1002 to perform the methodologies discussed herein.

Processor 1002 represents one or more processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

According to a particular embodiment, there is a system for monitoring livestock, in which the system includes a memory to store instructions; a processor to execute the instructions; a database system to store data for heads of livestock, in which each head of livestock is individually identifiable via a Radio-Frequency Identification (RFID) tag affixed to each of the heads of livestock, the RFID tag uniquely identifying each of the heads of livestock to the system; an antenna array formed from a plurality of antennas configurable to read information transmitted from the RFID tags upon any one or more of the heads of livestock entering a defined feeding zone; a transactional and analytical server to receive the information transmitted from the RFID tags and to store the information in the database system defining at least (i) a time of entry into the defined feeding zone and (ii) a time of exit from the defined feeding zone; in which the transactional and analytical server further is to analyze the information stored in the database system to determine when each head of livestock is present within the defined feeding zone; in which the transactional and analytical server further is to monitor the heads of livestock for anomalous feeding behavior based on the analysis; and in which the transactional and analytical server further is to trigger an automatic alert notification when the anomalous feeding behavior is identified for any one of the heads of livestock.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system for monitoring livestock, wherein the system comprises:
   a memory to store instructions;
   a processor to execute the instructions;
   a database system to store data for heads of livestock, wherein each head of livestock is individually identifiable via a Radio-Frequency Identification (RFID) tag affixed to each of the heads of livestock, the RFID tag uniquely identifying each of the heads of livestock to the system;
   an antenna array formed from a plurality of antennas configurable to read information transmitted from the RFID tags upon any one or more of the heads of livestock entering a defined feeding zone;
   a transactional and analytical server to receive the information transmitted from the RFID tags and to store the information in the database system defining at least (i) a time of entry into the defined feeding zone and (ii) a time of exit from the defined feeding zone;
   wherein the transactional and analytical server further is to analyze the information stored in the database system to determine when each head of livestock is present within the defined feeding zone;
   wherein the transactional and analytical server further is to monitor the heads of livestock for anomalous feeding behavior based on the analysis; and
   wherein the transactional and analytical server further is to trigger an automatic alert notification when the anomalous feeding behavior is identified for any one of the heads of livestock.

2. The system of claim 1, wherein the defined feeding zone comprises one of:
   a feeding trough;
   a feeding pen;
   a feed dispenser; and
   a feeding area isolated by a control point through which any head of livestock must pass to gain access to the feeding area.

3. The system of claim 1, wherein the antenna array is configured as one of:
   a portal configuration for which the plurality of antennas form a reading arc at an entrance, exit, or control point through which any head of livestock must pass to gain access to the livestock's feed;
an area configuration for which the plurality of antennas form irradiate a defined area or geographic segment of a feedlot facility into which any head of livestock must enter to gain access to the livestock's feed; and
a shelf configuration for which the plurality of antennas form a three-dimensional pattern from which a reading volume is created at a feeder detecting and identifying each head of livestock individually at the time the RFID tag enters the feeder.

4. The system of claim 1, wherein the RFID tag is affixed to each respective head of cattle by one of:
a livestock ear tag having the RFID tag embodied therein at the time of manufacture;
an earring affixed to each respective head of cattle capable of attaching with the RFID tag;
an implantable pellet having the RFID tag embodied therein and affixed to the body of each respective head of cattle via a subcutaneous implant; and
a wearable collar work by each respective head of cattle.

5. The system of claim 1, wherein the antenna array formed from the plurality of antennas is further configurable to track a trajectory of each respective head of cattle through multiple defined zones of a feedlot including ingress and egress from the defined feeding zone.

6. The system of claim 5, wherein the transactional and analytical server further is to store directional pathing information in the database system defining either a traversed route or one or more zones through which each respective head of cattle has traversed in addition to (i) the time of entry into the defined feeding zone and (ii) the time of exit from the defined feeding zone.

7. The system of claim 1, wherein the transactional and analytical server further is to:
determine the presence of each respective head of cattle within the defined feeding zone over time; and
calculate a daily mean duration of time for each visit to the defined feeding zone by each respective head of cattle based on the information stored in the database system.

8. The system of claim 7, wherein the transactional and analytical server further is to:
plot the daily mean duration of time calculated for each visit to the defined feeding zone by each respective head of cattle into a control chart having an upper control limit and a lower control limit; and
automatically trigger an alarm condition indicating anomalous behavior when the plot breaches one of the upper control limit or the lower control limit of the control chart.

9. The system of claim 1:
wherein the system implements a beef cattle monitoring platform;
wherein the beef cattle monitoring platform executes via the processor and the memory of the system providing on-demand cloud based services to a plurality of subscribers; and
wherein each of the subscribers communicate with the beef cattle monitoring platform system via a computing device which is remote from the beef cattle monitoring platform and communicably interfaced with the beef cattle monitoring platform via a public Internet.

10. The system of claim 1:
wherein the system is to synchronize the information stored in the database system to a cloud computing and data repository platform remote from a feedlot within which the antenna array is configured; and
wherein the synchronization is performed over a secure communication path traversing a public Internet.

11. The system of claim 1:
wherein the system is to apply statistical monitoring to identify morbidity within the heads of livestock monitored by the system;
wherein the statistical monitoring is to identify an animal exhibiting anomalous behavior selected from the group comprising:
an aggressive animal within the heads of livestock monitored by the system;
a shy animal within the heads of livestock monitored by the system; and
a diseased animal within the heads of livestock monitored by the system; and
wherein the system is to trigger an alert for corrective behavior by a feedlot operator upon detection of the anomalous behavior.

12. The system of claim 1, wherein the analysis comprises analyzing the information stored in the database system using a control chart for Individual Measurements, Exponentially Weighted Moving Average (EWMA) to identify one or more of the heads of livestock cattle exhibiting anomalous behavior versus the herd or group consisting of the heads of livestock as monitored by the system.

13. The system of claim 1, wherein the heads of livestock comprise one of:
beef cattle livestock;
dairy cow livestock; and
sheep livestock.

14. A method for monitoring livestock performed by a system having at least a processor to execute instructions stored within a memory of the system, wherein the method comprises:
operating a database system storing data for heads of livestock, wherein each head of livestock is individually identifiable via a Radio-Frequency Identification (RFID) tag affixed to each of the heads of livestock, the RFID tag uniquely identifying each of the heads of livestock to the system;
reading information transmitted from the RFID tags via an antenna array formed from a plurality of antennas configurable to read the information upon any one or more of the heads of livestock entering a defined feeding zone;
receiving the information transmitted from the RFID tags and storing the information in the database system defining at least (i) a time of entry into the defined feeding zone and (ii) a time of exit from the defined feeding zone;
analyzing the information stored in the database system to determine when each head of livestock is present within the defined feeding zone;
monitoring the heads of livestock for anomalous feeding behavior based on the analysis; and
triggering an automatic alert notification when the anomalous feeding behavior is identified for any one of the heads of livestock.

15. The method of claim 14, wherein the antenna array is configured as one of:
a portal configuration for which the plurality of antennas form a reading arc at an entrance, exit, or control point through which any head of livestock must pass to gain access to the livestock's feed;

an area configuration for which the plurality of antennas form irradiate a defined area or geographic segment of a feedlot facility into which any head of livestock must enter to gain access to the livestock's feed; and a shelf configuration for which the plurality of antennas form a three-dimensional pattern from which a reading volume is created at a feeder detecting and identifying each head of livestock individually at the time the RFID tag enters the feeder.

16. The method of claim 14, further comprising:

tracking a trajectory of each respective head of cattle through multiple defined zones of a feedlot including ingress and egress from the defined feeding zone; and storing directional pathing information in the database system defining either a traversed route or one or more zones through which each respective head of cattle has traversed in addition to (i) the time of entry into the defined feeding zone and (ii) the time of exit from the defined feeding zone.

17. The method of claim 14, further comprising:

determining the presence of each respective head of cattle within the defined feeding zone over time;

calculating a daily mean duration of time for each visit to the defined feeding zone by each respective head of cattle based on the information stored in the database system;

plotting the daily mean duration of time calculated for each visit to the defined feeding zone by each respective head of cattle into a control chart having an upper control limit and a lower control limit; and automatically triggering an alarm condition indicating anomalous behavior when the plot breaches one of the upper control limit or the lower control limit of the control chart.

18. Non-transitory computer readable storage media having instructions stored thereupon that, when executed by a system having at least a processor and a memory therein, the instructions cause the system to perform operations comprising:

operating a database system storing data for heads of livestock, wherein each head of livestock is individually identifiable via a Radio-Frequency Identification (RFID) tag affixed to each of the heads of livestock, the RFID tag uniquely identifying each of the heads of livestock to the system;

reading information transmitted from the RFID tags via an antenna array formed from a plurality of antennas configurable to read the information upon any one or more of the heads of livestock entering a defined feeding zone;

receiving the information transmitted from the RFID tags and storing the information in the database system defining at least (i) a time of entry into the defined feeding zone and (ii) a time of exit from the defined feeding zone;

analyzing the information stored in the database system to determine when each head of livestock is present within the defined feeding zone;

monitoring the heads of livestock for anomalous feeding behavior based on the analysis; and triggering an automatic alert notification when the anomalous feeding behavior is identified for any one of the heads of livestock.

19. The non-transitory computer readable storage media of claim 18, wherein the antenna array is configured as one of:

a portal configuration for which the plurality of antennas form a reading arc at an entrance, exit, or control point through which any head of livestock must pass to gain access to the livestock's feed;

an area configuration for which the plurality of antennas form irradiate a defined area or geographic segment of a feedlot facility into which any head of livestock must enter to gain access to the livestock's feed; and a shelf configuration for which the plurality of antennas form a three-dimensional pattern from which a reading volume is created at a feeder detecting and identifying each head of livestock individually at the time the RFID tag enters the feeder.

20. The non-transitory computer readable storage media of claim 18, wherein the instructions when executed by the processor cause the system to perform further operations including:

tracking a trajectory of each respective head of cattle through multiple defined zones of a feedlot including ingress and egress from the defined feeding zone; and storing directional pathing information in the database system defining either a traversed route or one or more zones through which each respective head of cattle has traversed in addition to (i) the time of entry into the defined feeding zone and (ii) the time of exit from the defined feeding zone.

* * * * *